US012299822B2

(12) United States Patent
Dong et al.

(10) Patent No.: US 12,299,822 B2
(45) Date of Patent: May 13, 2025

(54) VIRTUAL CLOTHING CHANGING METHOD, APPARATUS, ELECTRONIC DEVICE AND READABLE MEDIUM

(71) Applicant: BEIJING ZITIAO NETWORK TECHNOLOGY CO., LTD., Beijing (CN)

(72) Inventors: Xin Dong, Beijing (CN); Xijin Zhang, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/743,455

(22) Filed: Jun. 14, 2024

(65) Prior Publication Data

US 2024/0331305 A1  Oct. 3, 2024

Related U.S. Application Data

(63) Continuation of application No. PCT/CN2022/137802, filed on Dec. 9, 2022.

(30) Foreign Application Priority Data

Dec. 15, 2021  (CN) .......................... 202111539373.2

(51) Int. Cl.
*G06T 19/00* (2011.01)
*G06T 7/11* (2017.01)
(Continued)

(52) U.S. Cl.
CPC ................ *G06T 19/00* (2013.01); *G06T 7/11* (2017.01); *G06T 7/13* (2017.01); *G06T 7/194* (2017.01);
(Continued)

(58) Field of Classification Search
None
See application file for complete search history.

(56) References Cited

U.S. PATENT DOCUMENTS 8,976,230 B1 * 3/2015 Vendrow ................. G09G 5/14
348/46
11,069,150 B2  7/2021 Sminchisescu et al.
(Continued)

FOREIGN PATENT DOCUMENTS

| CN | 107067299 A | 8/2017 |
| JP | 2018-113060 A | 7/2018 |
| WO | 2023/109666 A1 | 6/2023 |

OTHER PUBLICATIONS

International Search Report and Written Opinion received for PCT Patent Application No. PCT/CN2022/137802, mailed on Feb. 17, 2023, 11 pages.
(Continued)

*Primary Examiner* — Saptarshi Mazumder

(57) ABSTRACT

The present disclosure provides a virtual clothing changing method, apparatus, electronic device and readable medium. The method comprises: obtaining a source image and a target image, the source image comprising target clothing associated with a first human instance, the target image comprising a second human instance; obtaining first portrait information and first pose information of the source image and second pose information of the target image, respectively, by processing the source image and the target image; obtaining a clothing changed image by changing clothing of the second human instance in the target image to the target clothing in the source image according to the first portrait information, the first pose information and the second pose information.

26 Claims, 9 Drawing Sheets

(51) Int. Cl.
G06T 7/13 (2017.01)
G06T 7/194 (2017.01)
G06T 7/73 (2017.01)

(52) U.S. Cl.
CPC ...... *G06T 7/73* (2017.01); *G06T 2207/20081* (2013.01); *G06T 2207/20084* (2013.01); *G06T 2207/30196* (2013.01); *G06T 2210/16* (2013.01)

(56) References Cited

U.S. PATENT DOCUMENTS

2019/0371080 A1* 12/2019 Sminchisescu ......... G06T 17/20
2021/0398361 A1* 12/2021 Black ..................... G06T 17/20

OTHER PUBLICATIONS

Xie et al., "Towards Scalable Unpaired Virtual Try-On via Patch-Routed Spatially-Adaptive GAN", NeurIPS, Nov. 20, 2021, pp. 1-12.
Communication pursuant to Rules 70(2) and 70a(2) EPC for European Application No. 22906414.2, mailed Mar. 4, 2025, 1 page.
Extended European Search Report for European Application No. 22906414.2, mailed Feb. 12, 2025, 9 pages.
Honda S., "VITON-GAN: Virtual Try-on Image Generator Trained with Adversarial Loss," arXiv:1911.07926v1, Nov. 12, 2019, 2 pages.

* cited by examiner

VIRTUAL CLOTHING CHANGING METHOD, APPARATUS, ELECTRONIC DEVICE AND READABLE MEDIUM

The present application is a continuation of International Patent Application No. PCT/CN2022/137802, filed Dec. 9, 2022, which claims priority to Chinese Application No. 202111539373.2 filed with the Chinese Patent office on Dec. 15, 2021, the disclosures of which are incorporated herein by reference in their entities.

FIELD

Embodiments of the present disclosure relate to the technical field of image processing, and in particular, to a virtual clothing changing method, apparatus, electronic device and readable medium.

BACKGROUND

Nowadays, more and more people pick out their clothing online. However, since they cannot actually try on, people often do not know if the clothing really suits them; or, some people wonder how they would look in the clothing when they see it worn by others. In addition, in some scenarios, clothing changing processing needs to be performed to photos in order to make them more attractive and interesting or be used for specific purposes, such as dressing people in photos taken in daily life in formal wear and putting the clothing changed photos in their profiles. Therefore, virtual clothing changing has a wide range of applications.

Virtual clothing changing methods in the related art are simply clothing replacement, i.e., the clothing area in a given image is split out and moved to a human in another image, during which the clothing area may be simply scaled or rotated, etc. However, body shapes or poses of different humans are complex and varied, and there will be large errors when dressing humans with different body shapes or poses in the same clothing, resulting in mismatches between the clothing area and poses, rough treatment of the connection with body parts of humans and further strong limitations.

SUMMARY

The present disclosure provides a virtual clothing changing method and apparatus, electronic device and readable medium, so as to improve the flexibility and accuracy of virtual clothing changing.

In a first aspect, an embodiment of the present disclosure provides a method for virtual clothing changing, comprising:
  obtaining a source image and a target image, the source image comprising target clothing associated with a first human instance, the target image comprising a second human instance;
  obtaining first portrait information and first pose information of the source image and second pose information of the target image, respectively, by processing the source image and the target image; and
  obtaining a clothing changed image by changing clothing of the second human instance in the target image to the target clothing in the source image according to the first portrait information, the first pose information and the second pose information.

In a second aspect, an embodiment of the present disclosure further provides a method for virtual clothing changing, comprising:
  obtaining an image to be clothing changed; and
  changing clothing of a human instance in the image to be clothing changed to specified clothing by using a preset network;
  wherein the preset network is trained based on a sample image pair, the sample image pair comprises a sample target image and a corresponding sample clothing changed image, and the sample clothing changed image is obtained according to pose information of the sample target image.

In a third aspect, an embodiment of the present disclosure further provides an apparatus for virtual clothing changing, comprising:
  a first obtaining module, configured to obtain a source image and a target image, the source image comprising target clothing associated with a first human instance, the target image comprising a second human instance;
  a processing module, configured to, by processing the source image and the target image, obtain first portrait information and first pose information of the source image and second pose information of the target image, respectively; and
  a first clothing changing module, configured to, by changing clothing of the second human instance in the target image to the target clothing in the source image according to the first portrait information, the first pose information and the second pose information, obtain a clothing changed image.

In a fourth aspect, an embodiment of the present disclosure further provides an apparatus for virtual clothing changing, comprising:
  a second determining module, configured to obtain an image to be clothing changed;
  a second clothing changing module, configured to change clothing of a human instance in the image to be clothing changed to specified clothing by using a preset network.

In a fifth aspect, an embodiment of the present disclosure further provides an electronic device, comprising;
  one or more processors;
  a storage, configured to store one or more programs,
  the one or more programs, when executed by the one or more processors, causing the one or more processors to perform a virtual clothing changing method according to the embodiments of the present disclosure.

In a sixth aspect, an embodiment of the present disclosure further provides a computer readable medium, on which a computer program is stored, the computer program, when executed by a processor, performing a virtual clothing changing method according to the embodiments of the present disclosure.

BRIEF DESCRIPTION OF THE DRAWINGS

The same or similar reference numerals represent the same or similar elements throughout the figures. It should be understood that the accompanying drawings are merely schematic, and components and elements are not necessarily drawn to scale.

DETAILED DESCRIPTION OF EMBODIMENTS

It should be understood that various steps described in method embodiments of the present disclosure may be performed in a different order and/or in parallel. In addition, the method embodiments may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between multiple apparatuses in the implementation of the present disclosure are merely for the illustration purpose, rather than limiting the scope of these messages or information.

In the following multiple embodiments, each of the embodiments provides both example features and examples. Multiple features described in the embodiments may be combined to form multiple example solutions, and each numbered embodiment should not be considered as only one technical solution.

Figure 1:
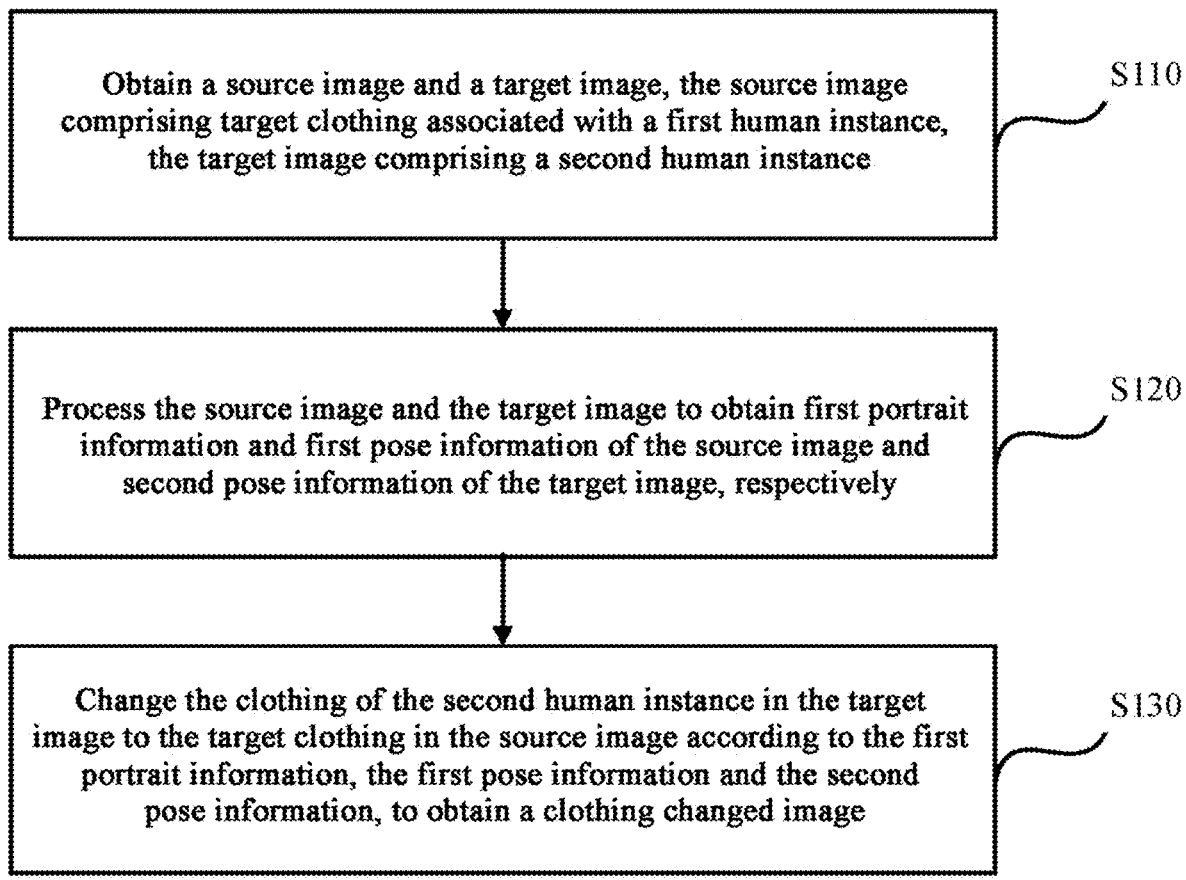
FIG. 1 is a schematic flowchart of a virtual clothing changing method according to an embodiment of the present disclosure.

FIG. 1 is a schematic flowchart of a virtual clothing changing method according to an embodiment of the present disclosure. The method is applicable to cases where target clothing is changed according to portrait information and pose information of different images to realize the virtual clothing changing between different humans. The method may be performed by an apparatus for virtual clothing changing, where the apparatus may be implemented as software and/or hardware and usually integrated in an electronic device. The electronic device may be a mobile device such as a mobile phone, a smart watch, a tablet computer and a personal digital assistant; it may also be another device such as a desktop computer.

As shown in FIG. 1, the virtual clothing changing method according to an embodiment of the present disclosure comprises:

Step 101: obtaining a source image and a target image, the source image comprising target clothing associated with a first human instance, the target image comprising a second human instance.

In this embodiment, the source image may refer to an image that provides the target clothing and contains the first human instance, such as an image of a model wearing the target clothing, the model being the first human instance. The source image may be obtained via a preset database, where the preset database may refer to a database with a large number of pre-stored images of models wearing the same or different clothing. The target image may refer to an image containing the second human instance to be clothing changed. For example, a user who wants to change clothing may upload a photo of himself, and the photo uploaded by the user is taken as the obtained target image. Where the human instance may be considered as a human object contained in the image. The target clothing may be considered as clothing that is provided by the source image for transferring onto the human instance in the target image. The source image and the target image may contain not only features of corresponding human instances and their corresponding clothing (e.g., the model and user themselves as well as the clothing they wear), but also features of backgrounds in which the corresponding human instances are located.

The first human instance may refer to a human object contained in the source image. The second human instance may refer to a human object contained in the target image.

S120: obtaining first portrait information and first pose information of the source image and second pose information of the target image, respectively, by processing the source image and the target image.

In this embodiment, the processing may refer to performing corresponding image processing to the source image and the target image to obtain corresponding portrait information and pose information. For example, regarding the extracted source image and target image, instance segmentation or semantic segmentation may be performed, poses of human instances in the source image and the target image may be recognized, key human body points of human instances in the source image and the target image may be extracted, and human instances in the source image and the target image may be parsed to determine different body parts and clothing features, etc.

The portrait information may refer to an image obtained after feature extraction of human instances and clothing contained in the source image and the target image, with the main purpose of determining the contours of human instances, exposed body parts, and body parts covered by clothing. The portrait information may comprise portrait segmentation information and portrait parsing information. The portrait segmentation information may refer to an image obtained by segmenting the image according to the overall contour of the human instance and clothing contained in the image, with the main purpose of determining the contour of the human instance. It is noteworthy that for the first human instance in the source image, the portrait segmentation information mainly refers to the contour of the first human instance wearing the target clothing. That is, the contour is determined by considering the contour of the target clothing, which may be understood as the contour being a union of the contour of the first human instance and the contour of the target clothing. The portrait parsing information may refer to an image obtained after contour segmentation and part parsing of the human instance and the clothing contained in the image, such as parsing and differentiation of exposed body parts such as limbs, head and feet of the human instance, and parsing and differentiation of the whole clothing, top and bottom, etc. Different parts in the portrait parsing information may be characterized by different colors or textures.

The pose information may refer to corresponding pixel point information obtained after performing human body key point location processing to the human instance contained in the source image and the target image, and multiple pixel point information may form an image characterizing a pose. The pose information may comprise 3-dimension (3D) pose information and 2-dimension (2D) pose information. The 3D pose information may refer to an image characterizing a stereoscopic pose of a human instance formed by 3D pixel point coordinates in the pixel point information, which may be characterized using a schematic diagram of a human body with a corresponding pose. The 2D pose information may refer to an image characterizing a pose formed by 2D pixel point coordinate information in the pixel point information, which may be characterized using key points or lines of key points that conform to the corresponding pose.

The first portrait information and the first pose information may be considered as portrait information and pose information obtained after processing the source image, respectively. The second pose information may be considered as pose information obtained after processing the target image.

It is noteworthy that this embodiment does not intend to limit a specific method of processing the source image and the target image, but a corresponding image processing algorithm may be flexibly selected according to actual needs.

S130: obtaining a clothing changed image by changing clothing of the second human instance in the target image to the target clothing in the source image according to the first portrait information, the first pose information and the second pose information.

In this embodiment, the clothing of the second human instance may be considered as the clothing of the human instance in the target image. It is noteworthy that the changing does not mean matting the clothing of the second human instance by using image matting and replacing it with the target clothing associated with the first human instance. The main principle of changing is to obtain the change of pose between the first human instance and the second human instance through analysis according to the first portrait information, the first pose information and the second pose information, so as to obtain the amount of displacement required to change the target clothing associated with the first human instance to the pose of the second human instance. Accordingly, the target clothing in the source image is subjected to a displacement change according to the required amount of displacement, so as to be integrated into the pose of the second human instance while replacing the clothing of the second human instance in the target image. Thus, the image of the target clothing under the pose of the second human instance may be obtained. On this basis, a corresponding clothing changed image may be obtained by replacing the clothing of the second human instance in the target image with the target clothing in the source image.

For example, in the changing process, a protected area of the second human instance may further be determined according to the second portrait information of the target image, and features in the protected area remain unchanged during changing the clothing of the second human instance in the target image to the target clothing in the source image.

The second portrait information may refer to portrait information obtained after processing the target image. The protected area may refer to exposed body parts of the second human instance in the target image, such as the face, hands and feet. In this embodiment, during changing of the clothing of the second human instance in the target image to the target clothing in the source image, in order to guarantee that parts of the second human instance (e.g., the user) in the target image such as the face, hands and feet will not be affected, the second human instance may be subjected to part segmentation and parsing by using the second portrait information, to determine a protected area of the second human instance and keep features in the protected area unchanged. Therefore, it is guaranteed that the user can accurately see the complete effect of the person being clothing changed in the target clothing.

For example, the clothing changed second human instance may be displayed on a specified background, such as a white background; or may be integrated into an original background of the target image. It is noteworthy that if the clothing changed second human instance is integrated into the original background of the target image, then operations such as image matting and background completion may be performed to the target image. For example, first, the original second human instance in the target image may be cut by image matting; then, the background of the target image after image matting may be completed by a corresponding image processing method; finally, the clothing changed second human instance may be integrated into the target image with the completed background, to obtain the corresponding clothing changed image. Based thereon, the clothing changed image is made more realistic and accurate by restoring the background and environment in which the clothing changed second human instance is located.

According to the virtual clothing changing method provided by embodiments of the present disclosure, first a source image and a target image are obtained, the source image containing target clothing associated with a first human instance, the target image containing a second human instance; then the source image and the target image are processed to obtain first portrait information and first pose information of the source image and second information of the target image respectively; finally clothing of the second human instance in the target image is changed to the target clothing in the source image according to the first portrait information, the first pose information and the second pose information, to obtain a clothing changed image. With the portrait information and the pose information of the source image and the target image, the method may change the target clothing between different humans. On this basis, the method may further change clothing of humans with any pose according to poses of different human instances, thereby improving the flexibility and accuracy of virtual clothing changing.

Figure 2:
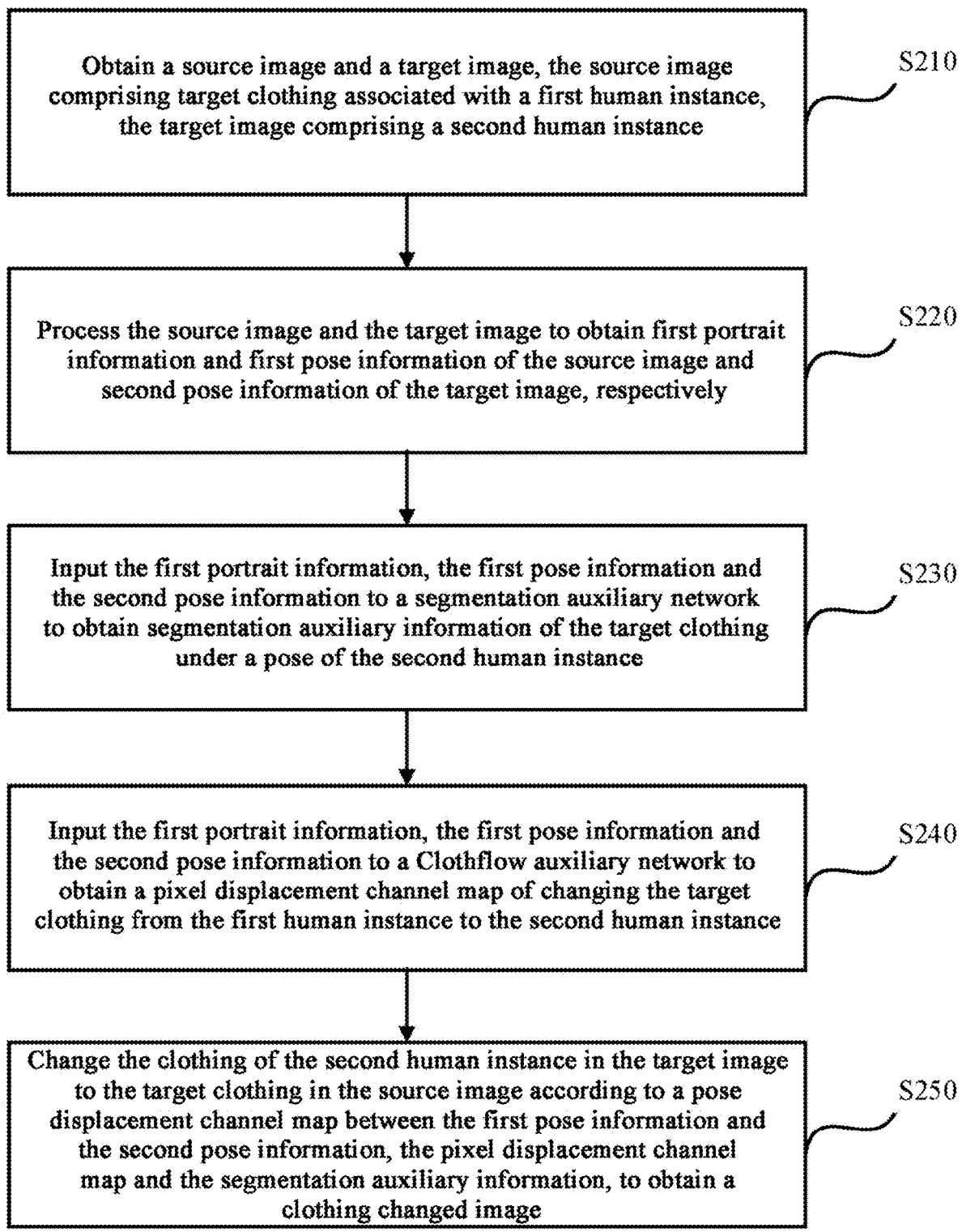
FIG. 2 is a schematic flowchart of a virtual clothing changing method according to a further embodiment of the present disclosure.

FIG. 2 is a schematic flowchart of a virtual clothing changing method according to a further embodiment of the present disclosure. This embodiment is refined on the basis of the example solution in the foregoing embodiment. In this embodiment, the process of changing the clothing of the second human instance in the target image to the target clothing in the source image according to the first portrait information, the first pose information and the second pose information so as to obtain a clothing changed image is described in detail. For content which is not detailed in this embodiment, reference may be made to the foregoing embodiment.

As shown in FIG. 2, a virtual clothing changing method according to a further embodiment of the present disclosure comprises:

S210: obtaining a source image and a target image, the source image containing target clothing associated with a first human instance, the target image containing a second human instance.

S220: obtaining first portrait information and first pose information of the source image and second pose information of the target image, respectively, by processing the source image and the target image.

S230: inputting the first portrait information, the first pose information and the second pose information into a segmentation network to obtain segmentation auxiliary information of the target clothing under the pose of the second human instance.

In this embodiment, the segmentation auxiliary network may refer to a neural network that segments contour feature information of clothing and a human instance in an image, e.g., a UNet network. The segmentation auxiliary information may refer to an output obtained by the segmentation auxiliary network according to the first portrait information, the first pose information and the second pose information, and the output is used to reflect features of the contour of the target clothing under the pose of the second human instance. A result of the output may be characterized by masks, so the segmentation auxiliary network may also be construed as a mask auxiliary network. That is, the segmentation auxiliary information may be considered as pose displacement changes between the first and second human instances obtained by the mask auxiliary network through analysis according to the first portrait information, the first pose information and the second pose. The obtained pose displacement changes cause the contour of the target clothing to be integrated into the pose of the second human instance after displacement according to the pose displacement changes. It is noteworthy that both the portrait information and the pose information obtained previously have considered the human instance itself and the contour of the target clothing. Therefore, in a case that the pose displacement change is obtained, the contour of the target clothing may further be adapted to the pose of the second human instance.

For example, the segmentation auxiliary network is a neural network comprising dual branch inputs, an input of a first branch comprising the first portrait information and the first pose information, where the first portrait information comprises first portrait segmentation information and first portrait parsing information, the first pose information comprises 3D human body pose information and human body key point information of the first human instance; an input of a second branch comprises second pose information, which comprises 3D human body pose information and human body key point information of the second human instance.

The dual branch inputs may be considered as two input branches, e.g., the segmentation auxiliary network may be a neural network comprising two input branches. A first branch may be considered as an input branch corresponding to the source image, and a second branch may be considered as an input branch corresponding to the target image.

The first portrait segmentation information and the first portrait parsing information may refer to portrait segmentation information and portrait parsing information obtained after processing the source image.

The 3D human body pose information may refer to an image that characterizes a stereoscopic pose and is obtained according to 3D pixel point coordinate information corresponding to human body key points of a human instance in an image. The human body key point information may refer to an image that characterizes a pose and is obtained according to 2D pixel point coordinate information corresponding to human body key points of a human instance in an image. Each human instance may have corresponding 3D human body pose information and the human body key point information.

For example, in the process of obtaining the corresponding segmentation auxiliary information with the segmentation auxiliary network, the input of the first branch may comprise the first portrait information and the first pose information, the input of the second branch at least comprises the second pose information or may further comprise the second portrait information and the second pose information, which is not limited in this regard.

Figure 3:
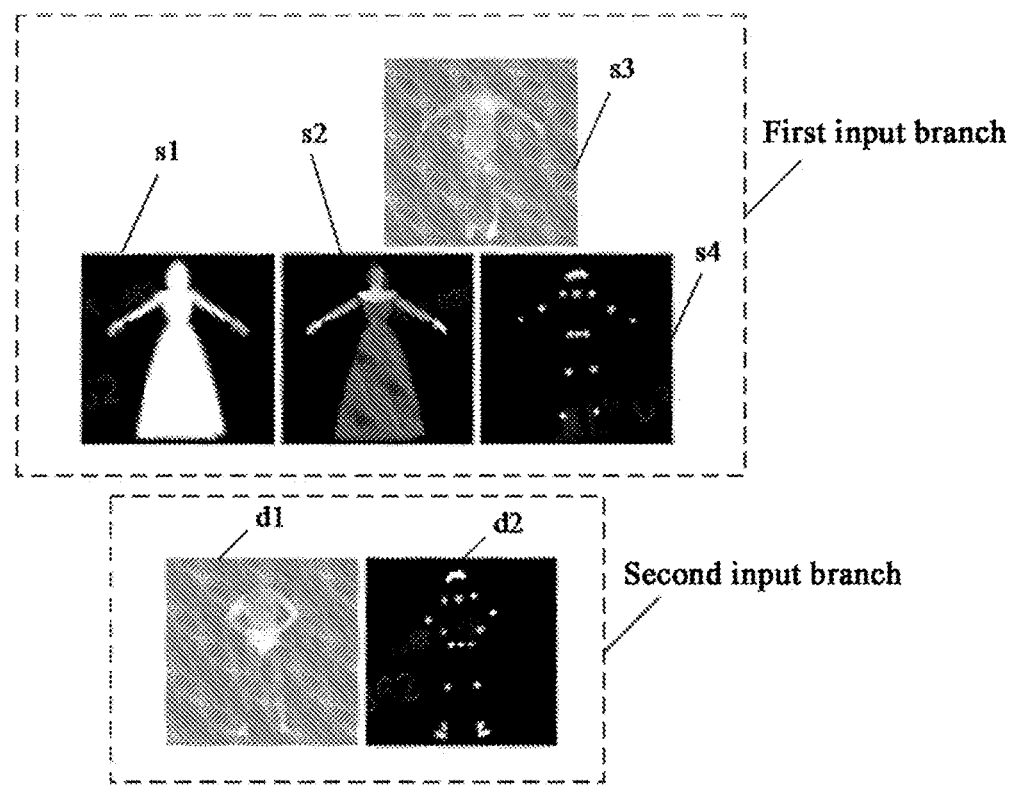
FIG. 3 is a schematic diagram of input branches of a segmentation auxiliary network according to an embodiment of the present disclosure.

FIG. 3 is a schematic diagram of input branches of a segmentation auxiliary network according to an embodiment of the present disclosure. As depicted, a first input branch represents an input branch corresponding to the source image, where s1 and s2 represent the first portrait segmentation information and the first portrait parsing information, respectively, and s3 and s4 represent the 3D human body pose information and the human body key point information of the first human instance, respectively; a second input branch represents an input branch corresponding to the target image, where d1 and d2 represent the 3D human body pose information and the human body key point information of the second human instance, respectively.

Figure 4:
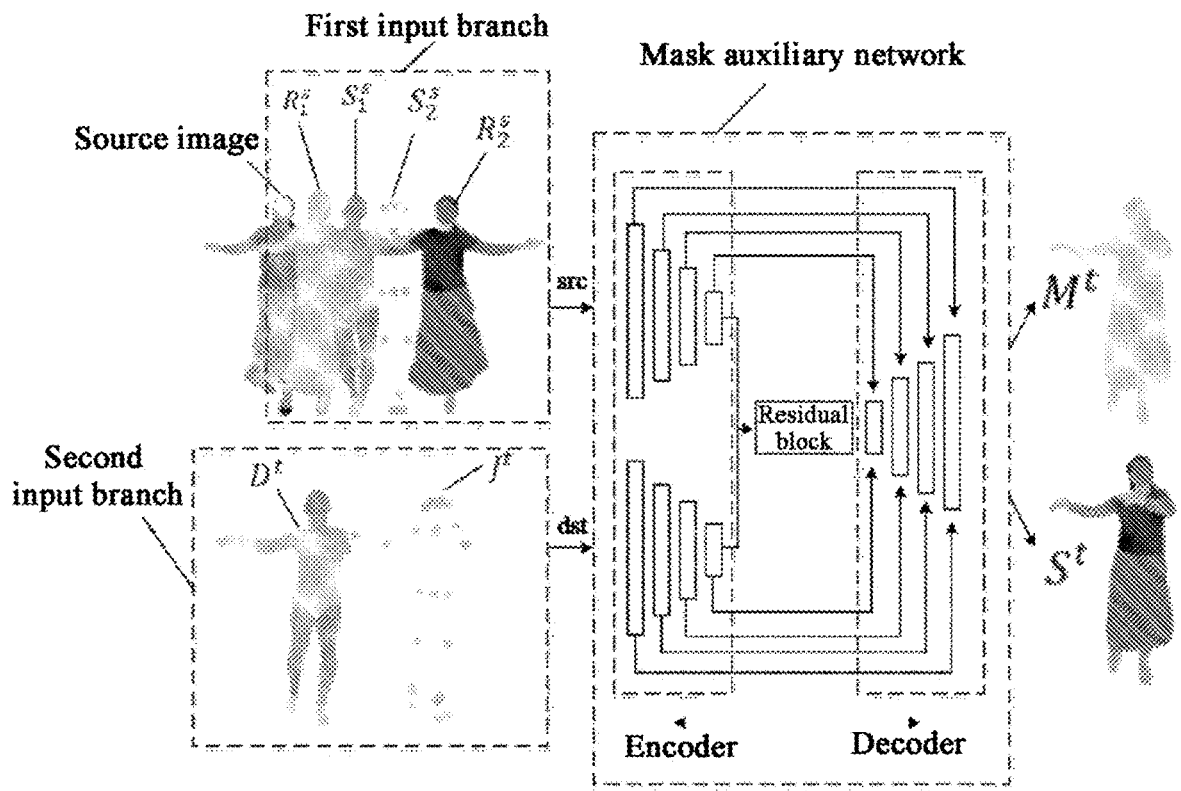
FIG. 4 is a schematic diagram of an implementation of generating segmentation auxiliary information based on a segmentation auxiliary network according to an embodiment of the present disclosure.

FIG. 4 is a schematic diagram of the implementation of generating segmentation auxiliary information based on a segmentation auxiliary network according to an embodiment of the present disclosure. As depicted, src represents an input branch corresponding to the source image, e.g., a first input branch, and dst represents an input branch corresponding to the target image, e.g., a second input branch. An encoder portion may be used to perform feature extraction to and encode information of the input branch; a decoder portion may be used to decode coded information which has been subjected to residual block processing; the encoder portion and the decoder portion each comprise multiple convolution kernels with different dimensions, e.g., usually 1×1, 3×3, 5×5 and 7×7, etc. Residual blocks may be used to perform corresponding image processing to information transmitted by the encoder. In the first input branch as shown in the figure, $R_1^s$ and $R_2^s$ represent the first portrait segmentation information and the first portrait parsing information, respectively; $S_1^s$ and $S_2^s$ represent the 3D human body pose information and the human body key point information of the first human instance, respectively. In the second input branch, $D^t$ and $J^t$ represent the 3D human body pose information and the human body key point information of the second human instance, respectively. In the output result of the mash auxiliary network, e . . . , the segmentation auxiliary information, $M^t$ represents the portrait segmentation information of the target clothing under the pose of the second human instance, and $S^t$ represents the portrait parsing information of the target clothing under the pose of the second human instance.

S240: inputting the first portrait information, the first pose information, the second pose information and the segmentation auxiliary information into a Clothflow auxiliary network to obtain a pixel displacement channel map of the target clothing changing from the first human instance to the second human instance.

In this embodiment, the Clothflow auxiliary network may refer to a neural network that predicts displacement changes of clothing pixel points, e.g., a UNet network. Its main principle is to cause the target clothing to be integrated into the pose of the second human instance in the target image by analyzing the pose displacement change between the first human instance and the second human instance and performing pixel point displacement change to the target clothing. The pixel displacement channel map may refer to an output obtained by the Clothflow auxiliary network through prediction according to the first portrait information, the first pose information, the second pose information and the segmentation auxiliary information, which is used to reflect the amount of displacement required to cause the target clothing to be integrated into the pose of the second human instance in the target image and which may be in the form of a 2-channel image. The 2-channel image may be considered as an image that characterizes the displacement change of each pixel point coordinate (x, y) of the target clothing.

For example, the Clothflow auxiliary network is a neural network comprising dual branch inputs, an input of a first branch comprising the first portrait information and the first pose information, where the first portrait information comprises first portrait segmentation information and first portrait parsing information, the first pose information comprises 3D human body pose information and human body key point information of the first human instance; an input of a second branch comprises segmentation auxiliary information and second pose information, where the segmentation auxiliary information comprises the second portrait segmentation information and the second portrait parsing information of the target clothing under the pose of the second human instance, and the second pose information comprises 3D human body pose information and human body key point information of the second human instance.

The second portrait segmentation information and the second portrait parsing information may refer to portrait segmentation information and portrait parsing information obtained after processing the target image.

Figure 5:
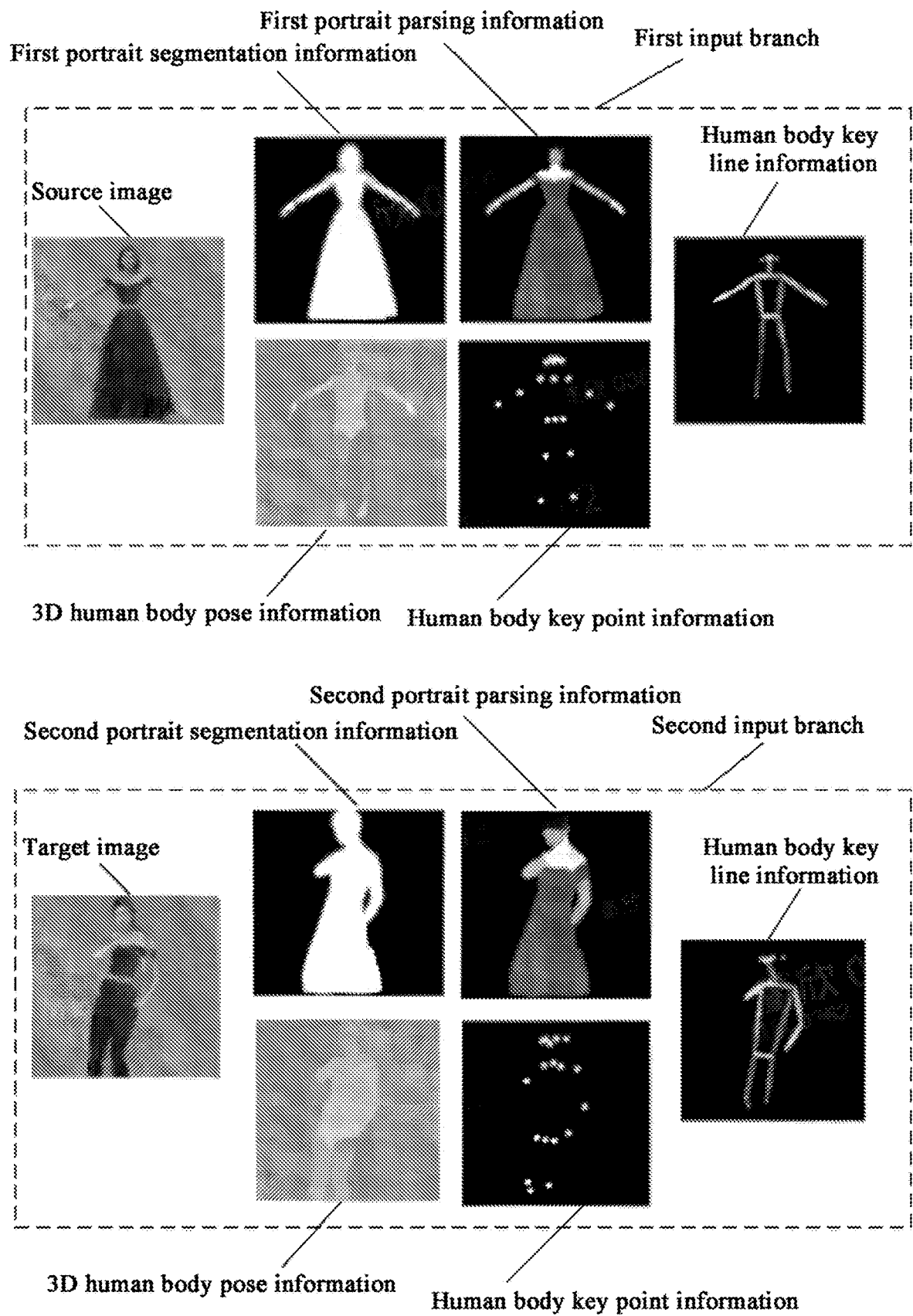
FIG. 5 is a schematic diagram of input branches of a Clothflow auxiliary network according to an embodiment of the present disclosure.

FIG. 5 is a schematic diagram of input branches of a Clothflow auxiliary network according to an embodiment of the present disclosure. As depicted, a first input branch represents an input branch corresponding to the source image, and a second input branch represents an input branch corresponding to the target image. In the second input branch, the second portrait segmentation information and the second portrait parsing information are segmentation auxiliary information outputted by a mask auxiliary module. It is noteworthy that the human body key line information is a parameterized human body model (Skinned Multi-Person Linear Model), which may be vividly construed as pose information formed by key point lines in the human body key point information. For example, in the two input branches of the Clothflow auxiliary network, the human body key line information may be added in order to improve the accuracy of the human body pose analysis.

Figure 6:
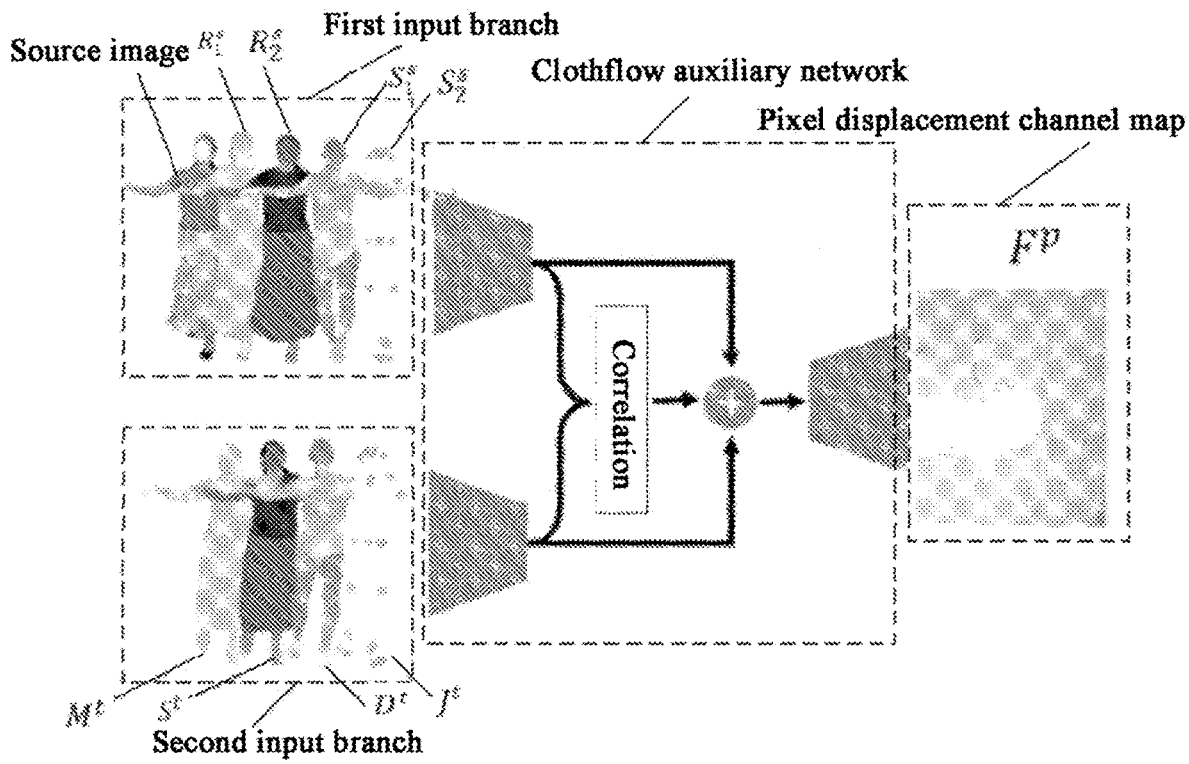
FIG. 6 is a schematic diagram of an implementation of generating a pixel displacement channel map based on a Clothflow auxiliary network according to an embodiment of the present disclosure.

FIG. 6 is a schematic diagram of the implementation of generating a pixel displacement channel map based on the Clothflow auxiliary network according to an embodiment of the present disclosure. As depicted, the first portrait information and the first pose information are inputted into a first branch, and the output result (e.g., the segmentation auxiliary information) of the mask segmentation auxiliary network and the second pose information are inputted into a second branch. Through the corresponding processing by the Clothflow auxiliary network, the obtained output result is a pixel displacement channel map $F^p$ where the target clothing is changed from the first human instance to the second human instance. The processing performed by the Clothflow auxiliary network to the multiple input information is not described in detail here.

S250: obtain a clothing changed image by changing the clothing of the second human instance in the target image to the target clothing in the source image according to the pose displacement channel map between the first pose information and the second pose information, the pixel displacement channel map and the segmentation auxiliary information.

In this embodiment, the pose displacement channel map may refer to a 2-channel image used for reflecting the pose displacement change between the first and second human instances. For example, the pose information may comprise the 3D human body pose information, the human body key point information and/or the human body key line information. On this basis, according to the pose displacement channel map, the pixel displacement channel map and the segmentation auxiliary information and by taking into consideration the pose displacement change, the pixel displacement change of the target clothing and the feature of the target clothing under the pose of the second human instance, the clothing of the second human instance in the target image may be changed to the target clothing in the source image so as to obtain a clothing changed image. This clothing changing process may also be implemented by using a neural network.

The virtual clothing changing method according to the embodiment of the present disclosure concretizes the process of obtaining the clothing changed image according to the portrait information and the pose information. By using the method, the portrait information and the pose information are subjected to corresponding segmentation and displacement change prediction with the segmentation auxiliary network and the Clothflow auxiliary network, and the clothing changing is implemented according to the pose displacement channel map, the pixel displacement channel map and the segmentation auxiliary information obtained from the processing, so as to implement the displacement change and pose integration of the target clothing under the pose change of different human instances and improve the flexibility and accuracy of virtual clothing changing.

Figure 7:
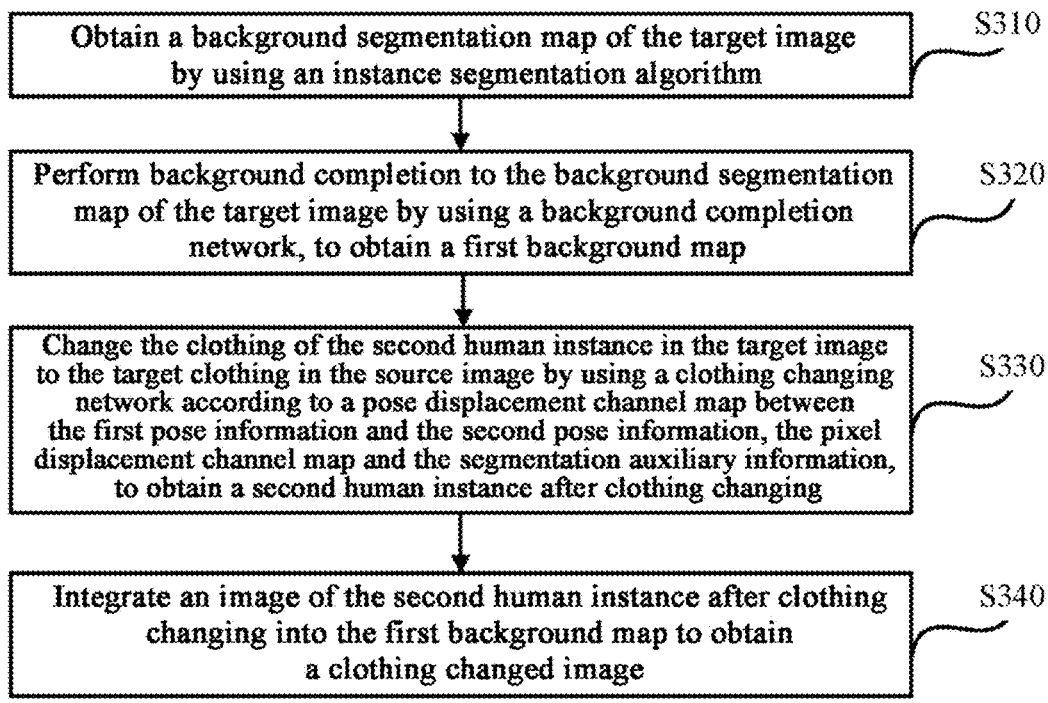
FIG. 7 is a schematic flowchart of a virtual clothing changing method according to a further embodiment of the present disclosure.

FIG. 7 is a schematic flowchart of a virtual clothing changing method according to a further embodiment of the present disclosure, which embodiment is refined on the basis of the example solution in the foregoing embodiment. In this embodiment, a detailed description is presented to the process of changing the clothing of the second human instance in the target image to the target clothing in the source image according to the pose displacement channel map, the pixel displacement channel map and the segmentation auxiliary information so as to obtain a clothing changed image. For content which is not detailed in this embodiment, reference may be made to any of the foregoing embodiments.

As shown in FIG. 7, a virtual clothing changing method according to an embodiment of the present disclosure comprises:

S310: obtaining a background segmentation map of a target image by using an instance segmentation algorithm.

In this embodiment, the instance segmentation algorithm may refer to an algorithm that segments object instances of certain classes in an image at the pixel level. The background segmentation map of the target image may be considered as an image remaining after matting the human instance in the target image by using the instance segmentation algorithm.

S320: obtain a first background map by completing the background of the background segmentation map of the target image by using a background completion network.

In this embodiment, the background completion network may refer to a neural network that performs background completion to a blank area cut from the background segmentation map. For example, the principle of background completion mainly refers to filling in the blank area in the background segmentation map based on the texture or features around that blank area. As an example, for the blank area where the human instance in the background segmentation map in the target image is located, a corresponding area background is generated by the background completion network, and then the generated area background is filled into the blank area in the background segmentation map of the target image, in order to complete the blank area and obtain the complete background. On this basis, the background segmentation map of the target image after the background completion is the first background map.

Figure 8:
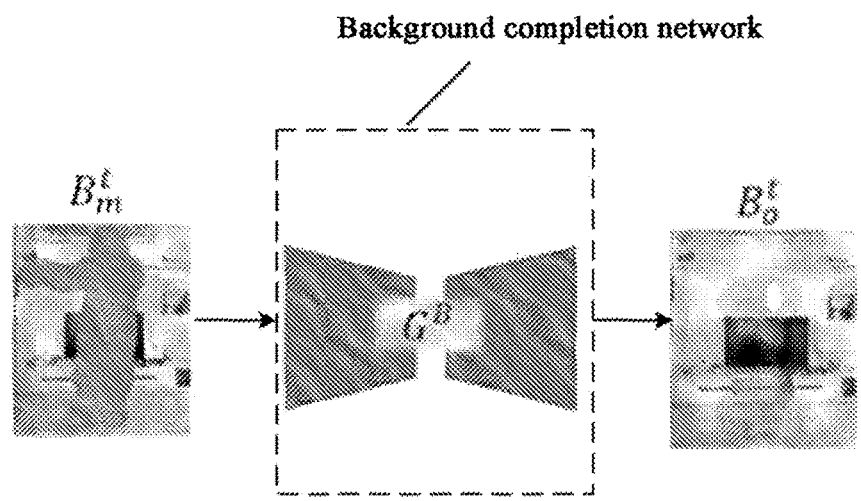
FIG. 8 is a schematic diagram of an implementation of background completion based on a background completion network according to an embodiment of the present disclosure.

FIG. 8 is a schematic diagram of background completion performed based on a background completion network according to an embodiment of the present disclosure. As depicted, $G^B$ represents the background completion network, $B_m^t$ represents the background segmentation map of the target image, and $B_o^t$ represents the first background map after the background completion.

S330: obtain the clothing changed second human instance by changing the clothing of the second human instance in the target image to the target clothing in the source image by using a clothing changing network according to the pose displacement channel map between the first pose information and the second pose information, the pixel displacement channel map and the segmentation auxiliary information.

In this embodiment, the clothing changing network may refer to a neural network that is capable of changing the clothing between different human instances. According to the pose displacement channel map between the first pose information and the second pose information, the pixel displacement channel map and the segmentation auxiliary information, a relative displacement change of the clothing of the second human instance in the target image may be generated by using the clothing changing network according to the pose of the second human instance, so that the target clothing after the displacement change may be integrated into the pose of the second human instance in the process of changing the clothing of the second human instance in the target image to the target clothing, so as to obtain the clothing changed second human instance.

For example, obtaining the clothing changed second human instance by changing the clothing of the second human instance in the target image to the target clothing in the source image according to the pose displacement channel map between the first pose information and the second pose information, the pixel displacement channel map and the segmentation auxiliary information comprises: determining a pose displacement channel map according to the first pose information and the second pose information; obtaining a combined displacement channel map by overlaying the pose displacement channel map with the pixel displacement channel map; obtaining the clothing changed second human instance by inputting the segmentation auxiliary information and the combined displacement channel map into the clothing changing network to change the clothing of the second human instance in the target image to the target clothing in the source image by using the clothing changing network.

The overlaying may refer to integrating feature information of the pose displacement channel map and feature information of the pixel displacement channel map. On this basis, a combined displacement channel map of feature information can be obtained by overlaying the pose displacement channel map and the pixel displacement channel map.

For example, first the segmentation auxiliary information obtained by the mask auxiliary network and the combined displacement channel map obtained after the overlaying are inputted to the clothing changing network. In addition, the feature information of the protected area of the second human instance may also be inputted to the clothing changing network so as to guarantee that the feature of the protected area of the clothing changed second human instance remains unchanged. Then, the inputted information is processed accordingly by using the clothing changing network. Finally, the clothing of the second human instance in the target image is changed to the target clothing in the source image to obtain the clothing changed second human instance.

S340: obtain a clothing changed image by integrating the clothing changed second human instance image into the first background map.

In this embodiment, the clothing changed second human instance is integrated in a corresponding position in the first background map by using a corresponding image processing algorithm, to obtain the clothing changed image.

Figure 9:
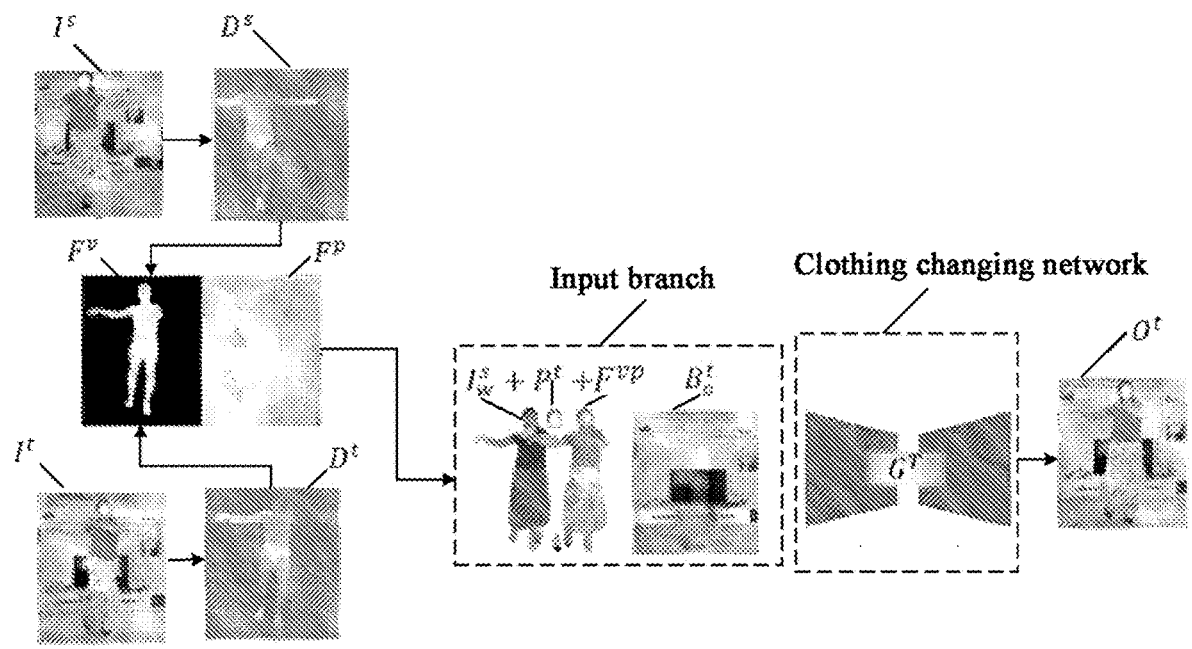
FIG. 9 is a schematic diagram of an implementation of generating a clothing changed image based on a clothing changing network according to an embodiment of the present disclosure.

FIG. 9 is a schematic diagram of the implementation of generating a clothing changed image based on a clothing changing network according to an embodiment of the present disclosure. As depicted, $I^s$ represents the source image, $I^t$ represents the target image, $D^s$ represents the 3D human body pose information of the first human instance in the source image, and $D^t$ represents the 3D human body pose information of the second human instance in the target image; $F^v$ represents the pose displacement channel map determined according to $D^s$ and $D^t$, and $F^p$ represents the pixel displacement channel map. In an input branch of the clothing changing network, $I_w^s$ represents the segmentation auxiliary information, $P^t$ represents a feature map of the protected area of the second human instance, $F^{vp}$ represents the combined displacement channel map generated by overlaying $F^{vp}$ and $F^p$, and $B_o^t$ represents the first background map corresponding to the target image. $G^T$ represents the clothing changing network, and $O^t$ represents an output result of the clothing changing network, e.g., the clothing changed image obtained by integrating the clothing changed second human instance image into the first background map.

The virtual clothing changing method according to the embodiment of the present disclosure concretizes the process of changing the clothing by using the clothing changing network. With the method, the background of the target image is completed by the background completion network, and the clothing changed second human instance is integrated into the completed background map of the target image. By maintaining the features of the clothing changing background, the fineness of virtual clothing changing can be further increased, and the user experience of virtual clothing changing is improved.

Figure 10:
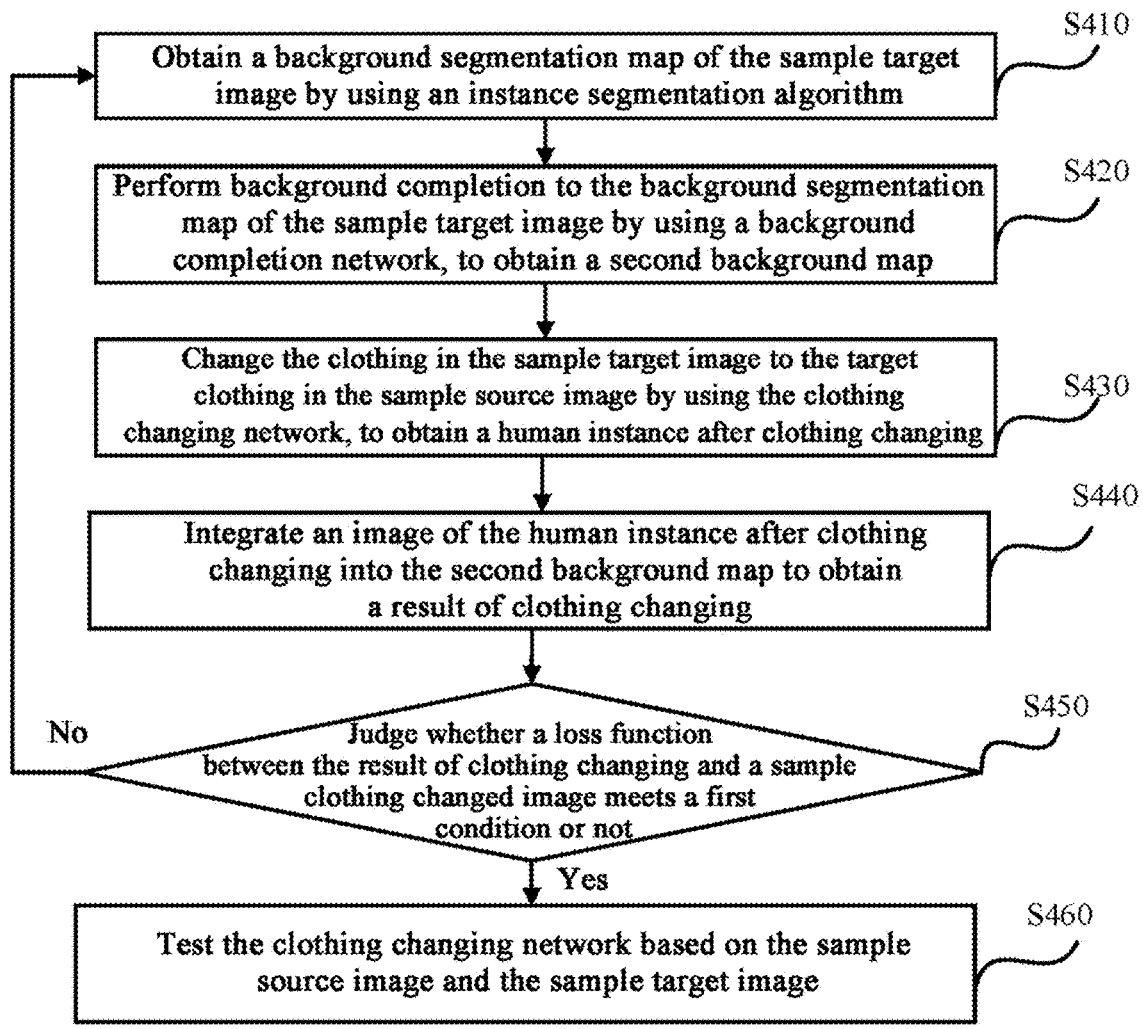
FIG. 10 is a schematic flowchart of training a clothing changing network according to an embodiment of the present disclosure.

FIG. 10 is a schematic flowchart of training a clothing changing network according to an embodiment of the present disclosure, which embodiment is refined on the basis of multiple example solutions in the foregoing embodiments. In this embodiment, a detailed description is presented to the process of training and texting the clothing changing network. For content which is not detailed in this embodiment, reference may be made to any of the foregoing embodiments.

As shown in FIG. 10, a virtual clothing changing method according to an embodiment of the present disclosure comprises:

S410: obtaining a background segmentation map of a sample target image by using an instance segmentation algorithm.

In this embodiment, the sample target image may refer to a sample image containing clothing to be changed and a corresponding human instance. There may be multiple sample target images, e.g., multiple sample images having different human instance poses. In this step, before inputting the sample target image into a clothing changing network, a background segmentation map of the sample target image is obtained by using an instance segmentation algorithm.

420: performing background completion to the background segmentation map of the target image by using a background completion network, to obtain a first background map.

In this embodiment, the background of the above obtained background segmentation map of the sample target image is completed with a background completion network to obtain a second background map.

S430: changing the clothing in the sample target image to the target clothing in a sample source image by using a clothing changing network to obtain a clothing changed human instance.

In this embodiment, the sample source image may be considered as a sample image for providing the target clothing and containing a human instance. The clothing in the sample target image is changed to the target clothing in the sample source image by using the clothing changing network according to the portrait information and the pose information corresponding to the sample source image and the sample target image, to obtain the clothing changed human instance.

S440: integrating an image of the clothing changed second human instance into the second background map to obtain a clothing changing result.

In this embodiment, the clothing changing result may refer to a clothing changed image obtained by integrating the clothing changed human instance image into the second background map.

S450: determining whether a loss function between the clothing changing result and a sample clothing changed image meets a first condition or not. If yes, then performing S460; otherwise, returning to perform S410 and continuing iterative training.

In this embodiment, the sample clothing changed image may be considered as a standard image that the target clothing in the sample source image is transferred onto the human instance in the sample target image. The sample source image, the sample target image and the sample clothing changed image are all known and may be downloaded from a sample database or derived from real collected images, e.g., obtained by taking pictures of scenes of different people performing actual clothing changed.

It may be understood that the clothing changed result may be considered as a predicted clothing changed value of the clothing changing network, and the sample clothing changed image may be considered as a true value after the clothing changing. The loss function may be used to represent a different degree between the clothing changed result (e.g., predicted value) and the sample clothing changed image (e.g., true value) outputted by the clothing changing network. For example, the larger the value of the loss function, the larger the difference degree between the clothing changed result and the sample clothing changed image; the smaller the value of the loss function, the smaller the difference degree between the clothing changed result and the sample clothing changed image, and the closer to the true value, the better the robustness of the clothing changing network.

The first condition may be a set loss threshold range. For example, the loss function within this set threshold range corresponds to a clothing changed result with a smaller difference from the sample clothing changed image, which meets the training requirements of the clothing changing network.

In this embodiment, the clothing changing network is trained based on the sample source image, the sample target image and the sample clothing changed image. In each training iteration, if the loss function between the clothing changed result and the sample clothing changed image meets the first condition, it indicates that the training of the clothing changing network is finished; on the contrary, if the first condition is not met, then the flow returns to perform S410 to continue the iterative training of the clothing changing network until the loss function meets the first condition.

S460: testing the clothing changing network based on the sample source image and the sample target image.

In this embodiment, during the testing process, any two images are inputted into the input end of the clothing changing network, where the two images may be the sample source image and the sample target image among original samples or any two images being obtained.

For example, S460 comprises: transferring the clothing in the sample source image onto the human instance in the same target image to obtain an intermediate image, and transferring the clothing in the intermediate image onto the human instance in the sample source image to obtain a result image; determining a test result according to an error between the result image and the sample source image.

The error may be a value that characterizes the difference degree of feature information between the result image and the source image. If the error is large, it indicates that the test result of the clothing changing network is unsatisfactory, and the clothing changing network needs to be further trained; if the error is small or less than a certain set threshold, it indicates that the test result of the clothing changing network is good, and the training and testing of the clothing changing network is finished.

For example, the input images for testing may be the sample source image and the sample target image, the clothing of a human instance A in the sample source image is changed to a human instance B in the sample target image to obtain an intermediate image, and the human instance in the intermediate image is denoted as B', and further the clothing of human instance B' in the intermediate image is transferred onto the human instance A in the sample source image to obtain a result image, and the human instance in the result image is denoted as A'. On this basis, the error between the result image and the sample source image (mainly the error between human instances A and A') is determined, therefore the test result may be determined.

For example, the clothing changing network may further share a parameter of a reconstruction network. The reconstruction network may be considered as a neural network for reconstructing the background completed image from which the human instance has been cut, according to the portrait information and the pose information. In this embodiment, the source image is reconstructed using the reconstruction network, the feature transformation rule learned from the reconstruction network is provided to the clothing changing network in the form of network parameters to assist the training and learning of the clothing changing network. Therefore, the performance of the clothing changing network may be improved on the basis of increasing the training efficiency of the clothing changing network.

For example, the reconstruction network is used to perform the following operations in each iteration during the training process of the clothing changing network: obtaining a background segmentation map of the sample source image by using an instance segmentation algorithm; obtaining a third background map by completing the background of the background segmentation map of the sample source image with the background completion network; obtaining a reconstructed image by performing the image reconstruction with the reconstruction network according to the portrait information of the sample source image, an intersection of the sample source image and the pose information of the sample source image, and the third background map. Network parameters of the reconstruction network are shared to the clothing changing network until a loss function between the reconstructed image and the sample source image meets a second condition.

The second condition may be a set loss threshold range. For example, the loss function within this set threshold range corresponds to a reconstructed image with a smaller difference from the sample source image, which indicates a good reconstruction effect of the reconstruction network. On this basis, the loss function between the reconstructed image and the sample source network meeting the second condition indicates that the reconstruction effect of the reconstruction network is good, and corresponding network parameter are reliable. At this point, the network parameters of the reconstruction network may be shared to the clothing changing network.

Figure 11:
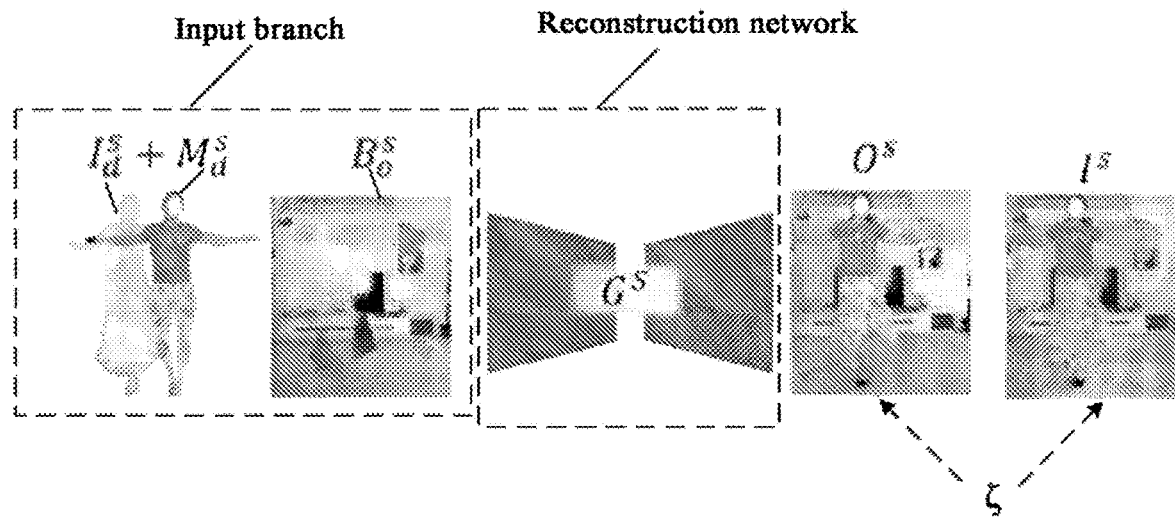
FIG. 11 is a schematic diagram of an implementation of reconstructing a sample source image based on a reconstruction network according to an embodiment of the present disclosure.

FIG. 11 is a schematic diagram of the implementation of constructing a sample source image based on a reconstruction network according to an embodiment of the present disclosure. As depicted, $G^S$ represents the construction network, $B_o^s$ represents the third background map corresponding to the sample source image, $I_d f$ represents the portrait segmentation information in the portrait information of the sample source image, $M_d^s$ represents an image obtained after overlaying the sample source image and the 3D human body pose information of the sample source image (the overlaying serves a purpose of taking an intersection of the sample source image and the 3D human body pose information of the sample source image, so that the range is narrowed and clothing features miss; when integrated into the portrait segmentation information of the sample source image, complete clothing features are restored, and thus the reconstruction is implemented). At the output end of the reconstruction network, $O^s$ represents an output result, e.g., the reconstruction image obtained from the image reconstruction according to $B_o^s$, $I_d^s$ and $M_d^s$. $I^s$ represents the sample source image, and $\zeta$ represents the loss function between the reconstructed image and the sample source image.

Figure 12:
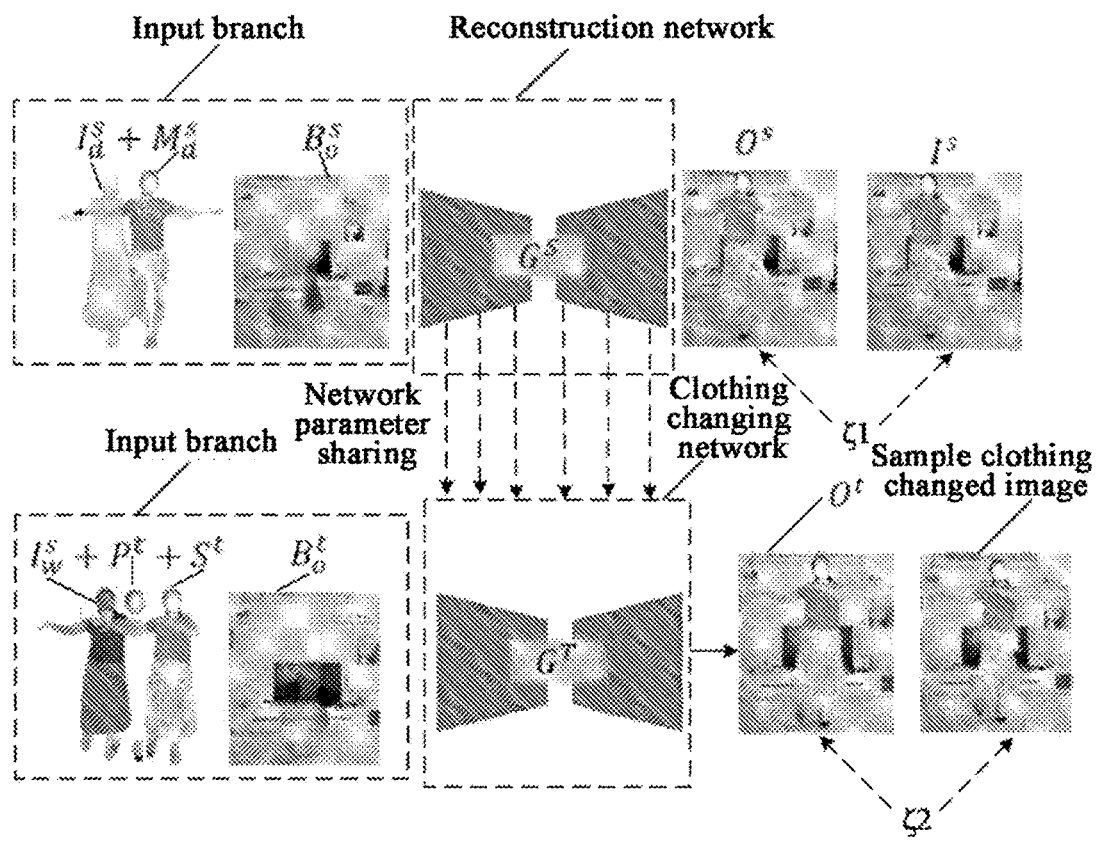
FIG. 12 is a schematic diagram of an implementation of training a clothing changing network according to an embodiment of the present disclosure.

FIG. 12 is a schematic diagram of the implementation of training a clothing changing network according to an embodiment of the present disclosure. As depicted, during training the clothing changing network, the reconstruction network shares network parameters to the clothing changing network, the training for which is completed and which meets the second condition; based thereon, the clothing changing network performs iterative training using the network parameters of the reconstruction network. Where $\zeta 1$ represents the loss function between the reconstructed image and the sample source image, and $\zeta 2$ represents the loss function between the clothing changed result of the clothing changing network and the sample clothing changed image.

The virtual clothing changing method according to the embodiment of the present disclosure concretizes the process of training and testing the clothing changing network. With the method, in the process of training the clothing changing network, by sharing reliable network parameters, which have been trained by the reconstruction network, to the clothing changing network, it is possible to assist the training and learning of the clothing changing network and effectively improve the performance of the clothing changing network on the basis of increasing the training efficiency of the clothing changing network. In addition, by testing the clothing changing network which has been trained, it is possible to further guarantee the performance effect of the clothing changing network and increase the accuracy of virtual clothing changed.

Figure 13:
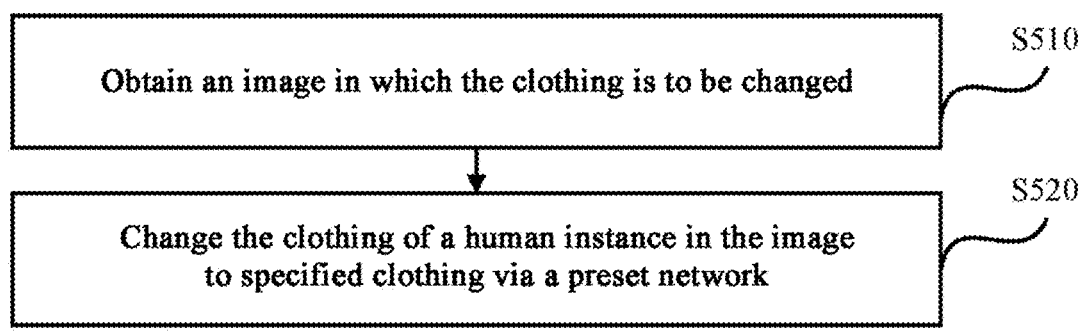
FIG. 13 is a schematic flowchart of a virtual clothing changing method according to a further embodiment of the present disclosure.

FIG. 13 is a schematic flowchart of a virtual clothing changing method according to an embodiment of the present disclosure. The method is applicable to cases where a human instance in any inputted image is clothing changed. The method may be performed by a virtual clothing changed apparatus, where the apparatus may be implemented as software and/or hardware and usually integrated in an electronic device. The electronic device may be a desktop computer, a notebook computer, a server, a tablet computer or a smart phone. It is noteworthy that the virtual clothing changing method in this embodiment may, regarding any specified clothing, realize fast clothing changed of any one inputted image without requiring the user to provide a source image. Therefore, the method is applicable to a simplified mobile application device, such as a mobile phone or tablet computer. For content which is not detailed in this embodiment, reference may be made to any embodiment(s) described above.

As shown in FIG. 13, the virtual clothing changing method according to the embodiment of the present disclosure comprises:

S510: obtaining an image to be clothing changed.

In this embodiment, the image to be clothing changed may be considered as an image that contains a human instance waiting for virtual clothing changing. For example, the t image to be clothing changed may be an image captured by the user or loaded to an electronic device, or an image read from a local album of the electronic device, the image containing a human instance to be clothing changed.

S520: changing clothing of a human instance in the image to be clothing changed to specified clothing by using a preset network.

The preset network is trained based on a sample image pair, the sample image pair comprising a sample target image and a corresponding sample clothing changed image, the sample clothing changed image being obtained according to pose information of the sample target image.

In this embodiment, the preset network may be considered as a network that is pre-trained and may perform virtual clothing changing. The specified clothing may be considered as the target clothing. The sample target image may refer to a sample image that contains a human instance to be clothing changed, and the sample clothing changed image may refer to an image obtained after changing the clothing of the human instance to be clothing changed to the specified clothing according to the pose information of the sample target image. The sample image pair may refer to multiple sample pairs formed by a large number of sample target images and corresponding sample clothing changed images.

It is noteworthy that the preset network is capable of dressing a human instance in any input image in the specified clothing without requiring the user to provide a source image. Unlike the clothing changing network, the training process of the preset network only needs the sample target image and the sample clothing changed image, taking the sample target image as an input and the sample clothing changed image as an output. The sample target image and the corresponding sample clothing changed image correspond to the state of the human instance to be clothing changed before and after the clothing changing, respectively.

In this embodiment, the sample clothing changed image is obtained according to the pose information of the sample target image. For the specified clothing, if the pose of the human instance in the target image differs, then the amount of displacement required by the specified clothing in the clothing changing process differs too. It is noteworthy that the sample target image and the sample clothing changed image may come from training samples of the clothing changing network in the foregoing embodiments; or the sample target image may be any image containing a human instance, and its corresponding sample clothing changed image may be generated by using the clothing changing network in the foregoing embodiments. In this case, for any image containing a human instance, the process of generating a corresponding clothing changed image according to the source image that provides the target clothing may be referred to any of the above embodiments, which is not described in detail.

In this embodiment, the specified clothing may be a default fixed clothing. In this case, the preset network, after trained, may be particularly used to change the clothing of the human instance in the image to be clothing changed to the default fixed clothing. For different clothing, respective dedicated preset networks may be trained. Fewer computational resources are consumed when change clothing by using the preset network, resulting in more professional and accurate clothing changed results.

The preset network may also be used to change multiple clothing, and the specified clothing may be randomly specified by the user (e.g., the user to be clothing changed) from a clothing library. In this case, the preset network needs to learn a feature transformation rule of transferring different clothing onto the human instance to be clothing changed. Thus, the performance requirement on the preset network in clothing changing is increased, based on which the clothing changing may be flexibly implemented for different specified clothing.

As an example, the preset network may be a generative adversarial network (GAN), e.g., a GAN-based image-to-image translation (pix2pix) model algorithm network. It is noteworthy that the preset network is a trained individual network, which may directly perform clothing changing. For example, regarding specified clothing, given an input to the preset network, such as an image to be clothing changed, a corresponding clothing changed image can be directly obtained at the output end of the preset network.

For example, a method of obtaining the sample clothing changed image according to the pose information of the sample target image may be determined according to the virtual clothing changing method as described in any of the foregoing embodiments.

For example, the corresponding sample clothing changed image may be generated according to the sample target image by using the virtual clothing changing method in any of the foregoing embodiments. On this basis, multiple sample image pairs formed by the sample target images and the corresponding sample clothing changed images are used as training data of the preset network to train the preset network, so that the preset network may learn the feature transformation rule in the clothing changing process through training and have the corresponding clothing changed capability. Thus, according to an input, for example an image to be clothing changed, a corresponding clothing changed result may be obtained, so as to implement the actual application of virtual clothing changing.

For example, the preset network comprises a generator and a discriminator; the training process of the preset network comprises: for the specified clothing, generating a composite image according to the sample target image by the generator; discriminating the authenticity of the composite image according to the sample dressing image by the discriminator; repeating the above operations of generating the composite image and discriminating the authenticity of the composite image until a discrimination result meets a training stop condition.

The generator may refer to a module in the preset network for generating a specific image by learning the feature distribution of a real image; for example, for the specified clothing, the generator learns the feature distribution information of the sample target image to generate a composite image of transferring the specified clothing onto the human instance in the sample target image. The composite image may be considered as a clothing changed image generated by the generator. The discriminator may refer to a module in the preset network for discriminating between true and false images generated by the generator according to real images. For example, the authenticity of the composite image is discriminated by the discriminator according to the sample clothing changed image.

The training stop condition may refer to a condition to stop training determined according to the discrimination result of the discriminator as to the authenticity of the composite image. For example, the training stop condition may be that discrimination results of all composite images are true, or the proportion of composite images with true discrimination results meets a set threshold, e.g., 90% of composite images with true discrimination result. The setting of the threshold is not limited here.

In the process of training the preset network, the generator and the discriminator repeat the operations of generating the composite image and discriminating the authenticity of the composite image until the discrimination result meets the training stop condition, then the training of the preset network is completed.

In the virtual clothing changing method according to the embodiments of the present disclosure, first an image to be clothing changed is obtained, and then the clothing of a human instance in the image to be clothing hanged is changed to specified clothing by a preset network; where the preset network is trained based on a sample image pair, the sample image pair comprising a sample target image and a corresponding sample clothing changed image, the sample clothing changed image being obtained according to pose information of the sample target image. By using the method, virtual clothing changing can be implemented through an independent preset network according to an input, providing convenience to users in the practical application. Moreover, by using the sample image pair generated through the virtual clothing changing method in the foregoing embodiments as training data, a reliable basis is provided for the training of the preset network, so that the trained preset network can guarantee the image quality after the clothing changing, and fast and accurate virtual clothing changing can be implemented on this basis.

Figure 14:
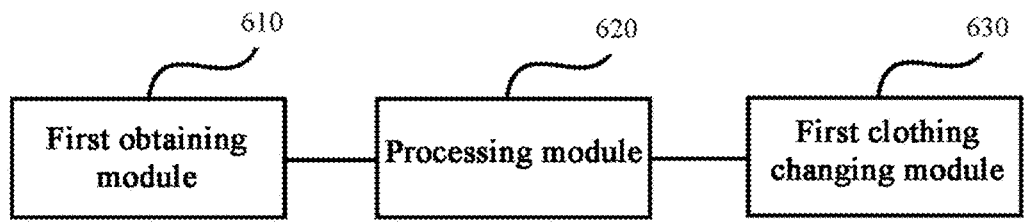
FIG. 14 is a structural schematic diagram of a virtual clothing changing apparatus according to an embodiment of the present disclosure.

FIG. 14 is a structural schematic diagram of a virtual clothing changing apparatus according to an embodiment of the present disclosure, where the apparatus may be implemented as software and/or hardware and generally integrated on an electronic device.

As depicted, the apparatus comprises: a first obtaining module 610, a processing module 620 and a first clothing changing module 630;

The first obtaining module 610 is configured to obtain a source image and a target image, the source image comprising target clothing associated with a first human instance, the target image comprising a second human instance;

The processing module 620 is configured to obtain first portrait information and first pose information of the source image and second pose information of the target image, respectively, by processing the source image and the target image;

The first clothing changing module 630 is configured to obtain a clothing changed image by changing clothing of the second human instance in the target image to the target clothing in the source image according to the first portrait information, the first pose information and the second pose information.

In this embodiment, the apparatus first obtains a source image and a target image by using the first obtaining module 610, the source image comprising target clothing associated with a first human instance, the target image comprising a second human instance; then processes the source image and the target image by using the processing module 620 to obtain first portrait information and first pose information of the source image and second pose information of the target image, respectively; and finally changes the clothing of the second human instance in the target image to the target clothing in the source image according to the first portrait information, the first pose information and the second pose information, to obtain a clothing changed image. By using the apparatus, the target clothing may be transferred between different humans by using the portrait information and the pose information of the source image and the target image. On this basis, the clothing of humans of any poses may be changed according to poses of different human instances, so that the flexibility and accuracy of virtual clothing changing is enhanced.

For example, the first clothing changing module 630 comprises:

a segmentation auxiliary information determining unit, configured to obtain segmentation auxiliary information of the target clothing under a pose of the second human instance by inputting the first portrait information, the first pose information and the second pose information to a segmentation auxiliary network;

a pixel displacement channel map determining unit, configured to obtain a pixel displacement channel map of changing the target clothing from the first human instance to the second human instance by inputting the first portrait information, the first pose information, the second pose information and the segmentation auxiliary information to a Clothflow auxiliary network;

a clothing changed image determining unit, configured to obtain the clothing changed image by changing the clothing of the second human instance in the target image to the target clothing in the source image according to a pose displacement channel map between the first pose information and the second pose information, the pixel displacement channel map and the segmentation auxiliary information.

For example, the segmentation auxiliary network is a neural network comprising dual branch inputs, an input of a first branch of the segmentation auxiliary network comprises the first portrait information and the first pose information, where the first portrait information comprises first portrait segmentation information and first portrait parsing information, and the first pose information comprises three dimensional human body pose information and human body key point information of the first human instance;

an input of a second branch input of the segmentation auxiliary network comprises the second pose information, the second pose information comprising three dimensional human body pose information and human body key point information of the second human instance.

For example, the Clothflow auxiliary network is a neural network comprising dual branch inputs, an input of a first branch of the Clothflow auxiliary network comprises the first portrait information and the first pose information, where the first portrait information comprises first portrait segmentation information and first portrait parsing information, and the first pose information comprises three dimensional human body pose information and human body key point information of the first human instance;

an input of a second branch of the Clothflow auxiliary network comprises the segmentation auxiliary information and the second pose information, where the segmentation auxiliary information comprises second portrait segmentation information and second portrait parsing information of the target clothing under the pose of the second human instance, and the second pose information comprising three dimensional human body pose information and human body key point information of the second human instance.

For example, the clothing changed image determining unit comprises:

a segmentation map determining sub-unit, configured to obtain a background segmentation map of the target image by using an instance segmentation algorithm;

a first background map determining sub-unit, configured to obtain a first background map by performing background completion to the background segmentation map of the target image by using a background completion network;

a second human instance determining sub-unit, configured to obtain a clothing changed second human instance by changing the clothing of the second human instance in the target image to the target clothing in the source image by using a clothing changing network according to the pose displacement channel map between the first pose information and the second pose information, the pixel displacement channel map and the segmentation auxiliary information;

a clothing changed image determining sub-unit, configured to obtaining the clothing changed image by integrating an image of the clothing changed second human instance into the first background map.

For example, the second human instance determining sub-unit is further configured to:

determine the pose displacement channel map according to the first pose information and the second pose information;

obtain a combined displacement channel map by overlaying the pose displacement channel map with the pixel displacement channel map;

obtain the clothing changed second human instance by inputting the segmentation auxiliary information and the combined displacement channel map to the clothing changing network so as to change the clothing of the second human instance in the target image to the target clothing in the source image by using the clothing changing network.

For example, the apparatus is further configured to: determine a protected area of the second human instance according to the second portrait information, features within the protected area remaining unchanged in a process of changing the clothing of the second human instance in the target image to the target clothing in the source image.

For example, the clothing changing network is trained based on a sample source image, a sample target image and a sample clothing changed image;

Based on the foregoing embodiments, the training process of the clothing changing network comprises: in each iterative process, performing the following operations until a loss function between the clothing changing result and the sample clothing changed image meets a first condition:

obtaining a background segmentation map of the sample target image by using an instance segmentation algorithm;

obtaining a second background map by performing background completion to the background segmentation map of the sample target image by using the background completion network;

obtaining a clothing changed human instance by changing clothing in the sample target image to the target clothing in the sample source image by using the clothing changing network;

obtaining the clothing changing result by integrating an image of the clothing changed human instance into the second background map.

For example, the clothing changing network shares network parameters of a reconstruction network.

The reconstruction network is configured to, in each iteration of the training process of the clothing changing network, perform the following operations, and share the network parameters of the reconstruction network to the clothing changing network in response to a loss function meeting a second condition:

obtaining a background segmentation map of the sample source image by using the instance segmentation algorithm;

obtaining a third background map by performing background completion to the background segmentation map of the sample source image by using the background completion network;

obtaining a reconstruction image by performing image reconstruction by using the reconstruction network according to portrait information of the sample source image, an intersection between pose information of the sample source image and the sample source image, and the third background map.

For example, the apparatus further comprises:

a testing module, configured to test the clothing changing network based on the sample source image and the sample target image.

Based on the foregoing embodiments, the testing the clothing changing network comprises:

obtaining an intermediate image by changing clothing in the sample source image to a human instance in the sample target image, and obtaining a result image by changing clothing in the intermediate image to a human instance in the sample source image;

determining a testing result according to an error between the result image and the sample source image.

The virtual clothing changing apparatus may perform the virtual clothing changing method according to any of the first to fourth embodiments of the present disclosure, with the corresponding functional modules and advantageous effects of the execution method.

Figure 15:
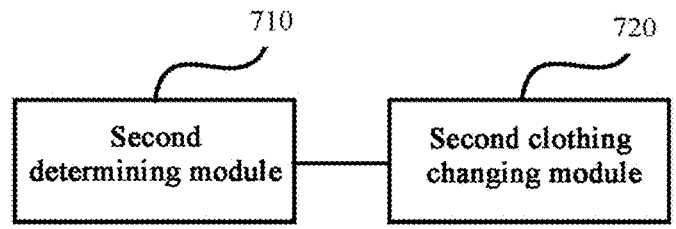
FIG. 15 is a structural schematic diagram of a virtual clothing changing apparatus according to a further embodiment of the present disclosure.

FIG. 15 is a structural schematic diagram of a virtual clothing changing apparatus according to an embodiment of the present disclosure, where the apparatus may be implemented as software and/or hardware and generally integrated on an electronic device.

As depicted, the apparatus comprises: a second determining module 710 and a second clothing changing module 720.

The second determining module 710 is configured to obtain an image to be clothing changed.

The second clothing changing module 720 is configured to change the clothing of a human instance in the image to be clothing changed to specified clothing by using a preset network; where the preset network is trained based on a sample image pair, the sample image pair comprises a sample target image and a corresponding sample clothing changed image, and the sample clothing changed image is obtained according to pose information of the sample target image.

In this embodiment, the apparatus first obtains an image to be clothing changed via the second determining module 710, and then the second clothing changing module 720 changes the clothing of a human instance in the image to be clothing changed to specified clothing by using a preset network; where the preset network is trained based on a sample image pair, the sample image pair comprising a sample target image and a corresponding sample clothing changed image, the sample clothing changed image being obtained according to pose information of the same target image. By using the apparatus, virtual clothing changing of clothing may be implemented according to an input via an independent preset network, so that convenience is provided for users in the practical application. In addition, by using the sample image pair generated with the virtual clothing changing method in the foregoing embodiments as training data, a reliable basis is provided for the training of the preset network. Therefore, the trained preset network can guarantee the image quality after the clothing changing. On this basis, fast and accurate virtual clothing changing is implemented.

For example, the preset network comprises a generator and a discriminator;

The training process of the preset network comprises:
generating a composite image for the specified clothing according to the sample target image by using the generator;
discriminating authenticity of the composite image according to the sample clothing changed image by using the discriminator;
repeating operations of generating the composite image and discriminating the authenticity of the composite image until a discrimination result meets a training stop condition.

For example, a method of obtaining the clothing changed image according to pose information of the sample target image is obtained according to the virtual clothing changing method as described in any of the foregoing embodiments.

The virtual clothing changing apparatus may perform the virtual clothing changing method according to the embodiments of the present disclosure, with the corresponding functional modules and advantageous effects of the execution method.

Figure 16:
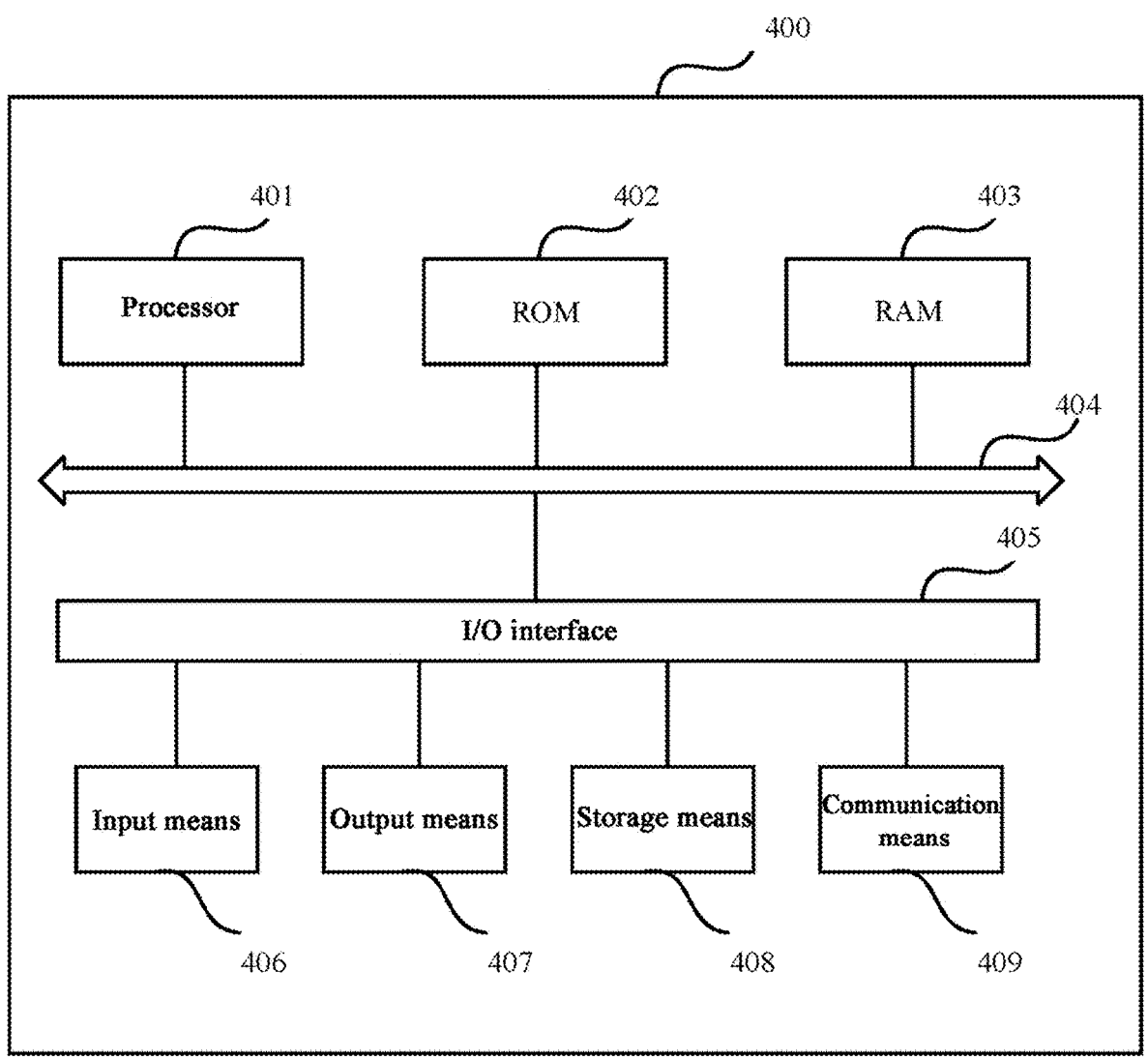
FIG. 16 is a structural block diagram of an electronic device according to an embodiment of the present disclosure.

FIG. 16 is a structural schematic diagram of an electronic device according to an embodiment of the present disclosure. The figure shows a structural schematic diagram of an electronic device 400 which is suitable to implement the embodiments of the present disclosure. The electronic device 400 shown in FIG. 16 is merely an example and should not bring any limitation to the functionality and use scope of the embodiments of the present disclosure.

As shown in FIG. 16 the electronic device 400 may comprise one or more processors (e.g., a central processor, a graphics processor, etc.) 401 which is capable of performing various appropriate actions and processes in accordance with a program stored in a read only memory (ROM) 402 or a program loaded from a storage 408 to a random access memory (RAM) 7403. The one or more processors 401 perform the virtual clothing changing method according to the present disclosure. In the RAM 403, there are also stored various programs and data required by the electronic device 400 when operating. The processor 401, the ROM 402 and the RAM 403 are connected to one another via a bus 404. An input/output (I/O) interface 405 is also connected to the bus 404.

Usually, the following means are connected to the I/O interface 405: input means 406 including a touch screen, a touch tablet, a keyboard, a mouse, a camera, a microphone, an accelerometer, a gyroscope or the like; output means 407 including a liquid crystal display, a loudspeaker a vibrator or the like; storage 408, including a magnetic tape, a hard disk or the like; and communication means 409. The communication means 409 allows the electronic device 400 to exchange information/data with other device in a wireless or wired way. Although FIG. 16 shows the electronic device 400 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication means 409, or installed from the storage 408, or installed from the ROM 402. The computer program, when executed by the processing means 401, may execute the above functions defined in the method according to the embodiments of the present disclosure. The computer readable storage medium may be a non-transitory computer readable storage medium.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device 400; and it may also exist alone without being assembled into the electronic device.

The above computer readable medium stores one or more programs, when the one or more programs executed by the processor, implement the following method. The computer readable medium carries one or more programs which, when executed by the electronic device, cause the electronic device 400 to: computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Where the name of a module does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the present disclosure, Example 1 provides a virtual clothing changing method, comprising:
    obtaining a source image and a target image, the source image comprising target clothing associated with a first human instance, the target image comprising a second human instance;
    obtaining first portrait information and first pose information of the source image and second pose information of the target image, respectively, by processing the source image and the target image;
    obtaining a clothing changed image by changing clothing of the second human instance in the target image to the target clothing in the source image according to the first portrait information, the first pose information and the second pose information.

According to one or more embodiments of the present disclosure, in Example 2 of the method as described in Example 1:
    obtaining the clothing changed image by changing the clothing of the second human instance in the target image to the target clothing in the source image according to the first portrait information, the first pose information and the second pose information comprises:
    obtaining segmentation auxiliary information of the target clothing under a pose of the second human instance by inputting the first portrait information, the first pose information and the second pose information to a segmentation auxiliary network;
    obtaining a pixel displacement channel map of changing the target clothing from the first human instance to the second human instance by inputting the first portrait information, the first pose information, the second pose information and the segmentation auxiliary information to a Clothflow auxiliary network;
    obtaining the clothing changed image by changing the clothing of the second human instance in the target image to the target clothing in the source image according to a pose displacement channel map between the first pose information and the second pose information, the pixel displacement channel map and the segmentation auxiliary information.

According to one or more embodiments of the present disclosure, in Examples 3 of the method as described in Example 2,
    the segmentation auxiliary network is a neural network comprising dual branch inputs, an input of a first branch of the segmentation auxiliary network comprises the first portrait information and the first pose information, wherein the first portrait information comprises first portrait segmentation information and first portrait parsing information, and the first pose information comprises three dimensional human body pose information and human body key point information of the first human instance;

an input of a second branch input of the segmentation auxiliary network comprises the second pose information, the second pose information comprising three dimensional human body pose information and human body key point information of the second human instance.

According to one or more embodiments of the present disclosure, in Example 4 of the method as described in Example 2, the Clothflow auxiliary network is a neural network comprising dual branch inputs, an input of a first branch of the Clothflow auxiliary network comprises the first portrait information and the first pose information, wherein the first portrait information comprises first portrait segmentation information and first portrait parsing information, and the first pose information comprises three dimensional human body pose information and human body key point information of the first human instance;

an input of a second branch of the Clothflow auxiliary network comprises the segmentation auxiliary information and the second pose information, wherein the segmentation auxiliary information comprises second portrait segmentation information and second portrait parsing information of the target clothing under the pose of the second human instance, and the second pose information comprising three dimensional human body pose information and human body key point information of the second human instance.

According to one or more embodiments of the present disclosure, in Example 5 of the method as described in Example 2, obtaining the clothing changed image by changing the clothing of the second human instance in the target image to the target clothing in the source image according to the pose displacement channel map between the first pose information and the second pose information, the pixel displacement channel map and the segmentation auxiliary information comprises:

obtaining a background segmentation map of the target image by using an instance segmentation algorithm;

obtaining a first background map by performing background completion to the background segmentation map of the target image by using a background completion network;

obtaining a clothing changed second human instance by changing the clothing of the second human instance in the target image to the target clothing in the source image by using a clothing changing network according to the pose displacement channel map between the first pose information and the second pose information, the pixel displacement channel map and the segmentation auxiliary information;

obtaining the clothing changed image by integrating an image of the clothing changed second human instance into the first background map.

According to one or more embodiments of the present disclosure, in Example 6 of the method as described in Example 5, obtaining the clothing changed image by changing the clothing of the second human instance in the target image to the target clothing in the source image according to the pose displacement channel map between the first pose information and the second pose information, the pixel displacement channel map and the segmentation auxiliary information comprises:

determining the pose displacement channel map according to the first pose information and the second pose information;

obtaining a combined displacement channel map by overlaying the pose displacement channel map with the pixel displacement channel map;

obtaining the clothing changed second human instance by inputting the segmentation auxiliary information and the combined displacement channel map to the clothing changing network so as to change the clothing of the second human instance in the target image to the target clothing in the source image by using the clothing changing network.

According to one or more embodiments of the present disclosure, in Example 7 of the method as described in Example 1, further comprised is:

determining a protected area of the second human instance according to the second portrait information, features within the protected area remaining unchanged in a process of changing the clothing of the second human instance in the target image to the target clothing in the source image.

According to one or more embodiments of the present disclosure, in Example 8 of the method as described in Example 5, the clothing changing network is trained based on a sample source image, a sample target image and a sample clothing changed image;

a training process of the clothing changing network comprises: in each iterative process, performing the following operations until a loss function between a clothing changing result and the sample clothing changed image meets a first condition:

obtaining a background segmentation map of the sample target image by using an instance segmentation algorithm;

obtaining a second background map by performing background completion to the background segmentation map of the sample target image by using the background completion network;

obtaining a clothing changed human instance by changing clothing in the sample target image to the target clothing in the sample source image by using the clothing changing network; and obtaining the clothing changing result by integrating an image of the clothing changed human instance into the second background map.

According to one or more embodiments of the present disclosure, in Example 9 of the method as described in Example 8, the clothing changing network shares network parameters of a reconstruction network;

wherein the reconstruction network is configured to, in each iteration of the training process of the clothing changing network, perform the following operations, and share the network parameters of the reconstruction network to the clothing changing network in response to a loss function meeting a second condition:

obtaining a background segmentation map of the sample source image by using the instance segmentation algorithm;

obtaining a third background map by performing background completion to the background segmentation map of the sample source image by using the background completion network; and obtaining a reconstruction image by performing image reconstruction by using the reconstruction network according to portrait information of the sample source image, an intersection between pose information of the sample source image and the sample source image, and the third background map.

According to one or more embodiments of the present disclosure, in Example 10 of the method as described in Example 5, further comprised is: testing the clothing changing network based on the sample source image and the sample target image, wherein testing the clothing changing network comprises:

obtaining an intermediate image by changing clothing in the sample source image to a human instance in the sample target image, and obtaining a result image by changing clothing in the intermediate image to a human instance in the sample source image; and determining a testing result according to an error between the result image and the sample source image.

According to one or more embodiments of the present disclosure, Example 11 provides a virtual clothing changing method, comprising:

obtaining an image to be clothing changed; and changing clothing of a human instance in the image to be clothing changed to specified clothing by using a preset network;

wherein the preset network is trained based on a sample image pair, the sample image pair comprises a sample target image and a corresponding sample clothing changed image, and the sample clothing changed image is obtained according to pose information of the sample target image.

According to one or more embodiments of the present disclosure, in Example 12 of the method as described in Example 11, the preset network comprises a generator and a discriminator;

the training process of the preset network comprises:

generating a composite image for the specified clothing according to the sample target image by using the generator;

discriminating authenticity of the composite image according to the sample clothing changed image by using the discriminator; and repeating operations of generating the composite image and discriminating the authenticity of the composite image until a discrimination result meets a training stop condition.

According to one or more embodiments of the present disclosure, in Example 13 of the method as described in Example 12, a method of obtaining the sample clothing changed image according to pose information of the sample target image is obtained according to the virtual clothing changing method as described in any of Examples 1 to 10.

According to one or more embodiments of the present disclosure, Example 14 provides a virtual clothing changing apparatus, comprising:

a first obtaining module, configured to obtain a source image and a target image, the source image comprising target clothing associated with a first human instance, the target image comprising a second human instance;

a processing module, configured to, by processing the source image and the target image, obtain first portrait information and first pose information of the source image and second pose information of the target image, respectively; and a first clothing changing module, configured to, by changing clothing of the second human instance in the target image to the target clothing in the source image according to the first portrait information, the first pose information and the second pose information, obtain a clothing changed image.

According to one or more embodiments of the present disclosure, Example 15 provides a virtual clothing changing apparatus, comprising:

a second determining module, configured to obtain an image to be clothing changed;

a second clothing changing module, configured to change clothing of a human instance in the image to be clothing changed to specified clothing by using a preset network; wherein the preset network is trained based on a sample image pair, the sample image pair comprises a sample target image and a corresponding sample clothing changed image, and the sample clothing changed image is obtained according to pose information of the same target image.

According to one or more embodiments of the present disclosure, Example 16 provides an electronic device, comprising;

one or more processors;

a storage, configured to store one or more programs, the one or more computer programs, when executed by the one or more processors, causing the one or more processors to perform a method as described in any of Example 1 to 13.

According to one or more embodiments of the present disclosure, Example 17 provides a computer readable medium, on which a computer program is stored, the program, when executed by a processor, performing a method as described in any of Examples 1 to 13.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

We claim:

1. A method for virtual clothing changing, comprising:

receiving a source image, the source image comprising target clothing;

receiving a target image, the target image comprising a second human instance and a second clothing;

extracting first portrait information and first pose information from the source image by processing the source image;

extracting second pose information of the target image by processing the target image;

determining a contour of the second human instance by processing the target image; and generating a clothing changed image by changing the second clothing to the target clothing for the second human instance in the target image based at least in part on the contour of the second human instance and the second pose information, wherein generating the clothing changed image comprises:

determining segmentation auxiliary information of the target clothing under a pose of the second human instance by applying a first artificial neural network to the first portrait information, the first pose information and the second pose information;

determining a pixel displacement channel map of changing the target clothing from the first human instance to the second human instance by applying a second artificial neural network to the first portrait information, the first pose information, the second pose information and the segmentation auxiliary information; and generating the clothing changed image by changing the clothing of the second human instance in the target image to the target clothing in the source image based at least in part on the pixel displacement channel map and the segmentation auxiliary information.

2. The method of claim 1, further comprising:

determining a contour of a covered body part of the second human instance associated with the target clothing based at least in part on the contour of the second human instance, a contour of the target clothing, the second pose information;

wherein the generating a clothing changed image includes generating the cloth changed imaged by changing the second clothing to the target clothing for the second human instance in the target image based at least in part on the contour of the second human instance, the contour of the covered body part of the second human instance and the second pose information.

3. The method of claim 2, wherein the covered body part of the second human instance associated with the target clothing is a second covered body part, wherein the second covered body part is different from a first covered body part of the second human instance in the target image.

4. The method of claim 3, wherein the second covered body part includes a portion of body part that is not in the first covered body part.

5. The method of claim 3, wherein the first covered body part includes a portion of body part that is not in the second covered body part.

6. The method of claim 3, wherein the generating the clothing changed image further comprising:

completing the portion of first covered body part that is not in the second covered body part with skin in the clothing changed image.

7. The method of claim 1, wherein:

the first artificial neural network is a neural network comprising dual branch inputs, an input of a first branch of the first artificial neural network comprises the first portrait information and the first pose information, wherein the first portrait information comprises first portrait segmentation information and first portrait parsing information, and the first pose information comprises three dimensional body pose information and body key point information of the first human instance; and an input of a second branch input of the first artificial neural network comprises the second pose information, wherein the second pose information comprises three dimensional human body pose information and human body key point information of the second human instance.

8. The method of claim 1, wherein:

the second artificial neural network is a neural network comprising dual branch inputs, an input of a first branch of the second artificial neural network comprises the first portrait information and the first pose information, wherein the first portrait information comprises first portrait segmentation information and first portrait parsing information, and the first pose information comprises three dimensional human body pose information and human body key point information of the first human instance; and an input of a second branch of the second artificial neural network comprises the segmentation auxiliary information and the second pose information, wherein the segmentation auxiliary information comprises second portrait segmentation information and second portrait parsing information of the target clothing under the pose of the second human instance, and the second pose information comprises three dimensional human body pose information and human body key point information of the second human instance.

9. The method of claim 8, wherein the generating the clothing changed image comprises:

determining a background segmentation map of the target image using an instance segmentation algorithm;

determining a first background map by performing background completion to the background segmentation map of the target image using a third artificial neural network;

generating a clothing changed second human instance by changing the clothing of the second human instance in the target image to the target clothing in the source image based at least in part on the pixel displacement channel map and the segmentation auxiliary information; and generating the clothing changed image by integrating an image of the clothing changed second human instance into the first background map.

10. The method of claim 9, wherein the generating a clothing changed second human instance comprises:

determining a pose displacement channel map according to the first pose information and the second pose information;

determining a combined displacement channel map by overlaying the pose displacement channel map with the pixel displacement channel map; and generating the clothing changed second human instance by inputting the segmentation auxiliary information and the combined displacement channel map to a fourth artificial neural network that is trained to change clothing.

11. The method of claim 10, further comprising:

determining a protected area that is not a portion of the second covered body part, wherein the protected area is a portion of the first covered body, wherein the protected area remains unchanged in the clothing changed image.

12. The method of claim 11, further comprising:
extracting a feature map from the protected area; and
applying the fourth artificial neural network to the segmentation auxiliary information, the feature map of the protected area, and the pixel displacement channel map.

13. The method of claim 10, wherein:
the fourth artificial neural network is trained based on a sample source image, a sample target image and a sample clothing changed image;
a training process of the fourth artificial neural network comprises:
determining a sample background segmentation map of the sample target image using the instance segmentation algorithm;
determining a second background map by performing background completion to the sample background segmentation map of the sample target image using the third artificial neural network;
generating a clothing changed human instance by changing clothing in the sample target image to the target clothing in the sample source image by using the fourth artificial neural network;
determining a clothing changing result by integrating an image of the clothing changed human instance into the second background map; and
determining a loss function based on the clothing changing result and the sample clothing changed image.

14. The method of claim 1, further comprising:
determining a protected area of the second human instance according to second portrait information, wherein features within the protected area remaining unchanged in a process of changing the clothing of the second human instance in the target image to the target clothing in the source image.

15. A system for virtual clothing changing, comprising:
one or more memories comprising instructions stored thereon; and
one or more processors configured to execute the instructions and perform a set of operations comprising:
receiving a source image, the source image comprising target clothing;
receiving a target image, the target image comprising a second human instance and a second clothing;
extracting first portrait information and first pose information from the source image by processing the source image;
extracting second pose information of the target image by processing the target image;
determining a contour of the second human instance by processing the target image; and
generating a clothing changed image by changing the second clothing to the target clothing for the second human instance in the target image based at least in part on the contour of the second human instance and the second pose information,
wherein generating the clothing changed image comprises:
determining segmentation auxiliary information of the target clothing under a pose of the second human instance by applying a first artificial neural network to the first portrait information, the first pose information and the second pose information;
determining a pixel displacement channel map of changing the target clothing from the first human instance to the second human instance by applying a second artificial neural network to the first portrait information, the first pose information, the second pose information and the segmentation auxiliary information; and
generating the clothing changed image by changing the clothing of the second human instance in the target image to the target clothing in the source image based at least in part on the pixel displacement channel map and the segmentation auxiliary information.

16. The system of claim 15, wherein the set of operations further comprises:
determining a contour of a covered body part of the second human instance based at least in part on the contour of the second human instance, a contour of the target clothing, the first pose information, the second pose information;
wherein the generating a clothing changed image includes generating the cloth changed imaged by changing the second clothing to the target clothing for the second human instance in the target image based at least in part on the contour of the second human instance, the contour of the covered body part of the second human instance, the first pose information and the second pose information.

17. The system of claim 16, wherein the covered body part of the second human instance associated with the target clothing is a second covered body part, wherein the second covered body part is different from a first covered body part of the second human instance in the target image.

18. The system of claim 17, wherein the second covered body part includes a portion of body part that is not in the first covered body part.

19. The system of claim 17, wherein the first covered body part includes a portion of body part that is not in the second covered body part.

20. The system of claim 17, wherein the generating the clothing changed image further comprising:
completing the portion of first covered body part that is not in the second covered body part with skin in the clothing changed image.

21. The system of claim 15, wherein the generating the clothing changed image comprises:
determining a background segmentation map of the target image using an instance segmentation algorithm;
determining a first background map by performing background completion to the background segmentation map of the target image using a third artificial neural network;
generating a clothing changed second human instance by changing the clothing of the second human instance in the target image to the target clothing in the source image based at least in part on the pixel displacement channel map and the segmentation auxiliary information; and
generating the clothing changed image by integrating an image of the clothing changed second human instance into the first background map.

22. The system of claim 21, wherein the generating a clothing changed second human instance comprises:
determining a pose displacement channel map according to the first pose information and the second pose information;
determining a combined displacement channel map by overlaying the pose displacement channel map with the pixel displacement channel map; and generating the clothing changed second human instance by inputting the segmentation auxiliary information and the combined displacement channel map to a fourth artificial neural network that is trained to change clothing.

23. The system of claim 22, wherein the set of operations further comprises:
determining a protected area that is not a portion of the second covered body part, wherein the protected area is a portion of the first covered body, wherein the protected area remains unchanged in the clothing changed image.

24. The system of claim 23, wherein the set of operations further comprises:
extracting a feature map from the protected area; and
applying the fourth artificial neural network to the segmentation auxiliary information, the feature map of the protected area, and the pixel displacement channel map.

25. The system of claim 15, wherein the set of operations further comprises:
determining a protected area of the second human instance according to second portrait information, wherein features within the protected area remaining unchanged in a process of changing the clothing of the second human instance in the target image to the target clothing in the source image.

26. A non-transitory computer readable storage medium, storing instructions for virtual clothing changing that, when executed by one or more processors, cause the one or more processors to perform a set of operations comprising:
receiving a source image, the source image comprising target clothing;
receiving a target image, the target image comprising a second human instance and a second clothing;
extracting first portrait information and first pose information from the source image by processing the source image;
extracting second pose information of the target image by processing the target image;
determining a contour of the second human instance by processing the target image; and
generating a clothing changed image by changing the second clothing to the target clothing for the second human instance in the target image based at least in part on the contour of the second human instance and the second pose information,
wherein generating the clothing changed image comprises:
determining segmentation auxiliary information of the target clothing under a pose of the second human instance by applying a first artificial neural network to the first portrait information, the first pose information and the second pose information;
determining a pixel displacement channel map of changing the target clothing from the first human instance to the second human instance by applying a second artificial neural network to the first portrait information, the first pose information, the second pose information and the segmentation auxiliary information; and
generating the clothing changed image by changing the clothing of the second human instance in the target image to the target clothing in the source image based at least in part on the pixel displacement channel map and the segmentation auxiliary information.

* * * * *